US012730463B2

(12) United States Patent
Hashimoto et al.

(10) Patent No.: US 12,730,463 B2
(45) Date of Patent: Sep. 8, 2026

(54) HEAT STORAGE POWER GENERATION SYSTEM AND POWER GENERATION CONTROL SYSTEM

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Atsushi Hashimoto, Tokyo (JP); Keiko Shimizu, Kawasaki Kanagawa (JP); Masakazu Shirakawa, Yokohama Kanagawa (JP); Atsushi Matsuzaki, Sagamihara Kanagawa (JP); Hiromutsu Miki, Yokohama Kanagawa (JP); Toyohiro Akebi, Tokyo (JP); Taufiq Hilal Tawab, Tokyo (JP); Takahiro Mori, Yokohama Kanagawa (JP); Hironori Watanabe, Yokohama Kanagawa (JP); Yusuke Fukamachi, Tokyo (JP); Syuntaro Abe, Tokyo (JP); Chikako Iwaki, Tokyo (JP); Takashi Mawatari, Kawasaki Kanagawa (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 356 days.

(21) Appl. No.: 18/570,909

(22) PCT Filed: Nov. 30, 2021

(86) PCT No.: PCT/JP2021/043877
§ 371 (c)(1),
(2) Date: Dec. 15, 2023

(87) PCT Pub. No.: WO2022/264451
PCT Pub. Date: Dec. 22, 2022

(65) Prior Publication Data

US 2024/0219941 A1 Jul. 4, 2024

(30) Foreign Application Priority Data

Jun. 17, 2021 (JP) ................................ 2021-101137

(51) Int. Cl.
*F28D 20/02* (2006.01)
*G05D 23/19* (2006.01)

(52) U.S. Cl.
CPC ................................ *G05D 23/1917* (2013.01)

(58) Field of Classification Search
CPC .. F28D 20/0056; F28D 20/0034; F28D 20/00; Y02E 60/14
See application file for complete search history.

(56) References Cited

U.S. PATENT DOCUMENTS 3,730,265 A * 5/1973 Lawrence .............. F28F 19/00 122/504
4,127,161 A * 11/1978 Clyne .................... F28D 20/02 165/104.31

(Continued)

FOREIGN PATENT DOCUMENTS

EP 3 245 467 B1 11/2017
EP 3 308 092 B1 4/2018

(Continued)

OTHER PUBLICATIONS

Hongkai et al., Green power generation technology for distributed power supply, 2008, IEEE, p. 1-4 (Year: 2008).*

(Continued)

*Primary Examiner* — McDieunel Marc
(74) *Attorney, Agent, or Firm* — Foley & Lardner LLP

(57) ABSTRACT

In one embodiment, a heat storage power generation system includes a heater to heat first fluid, and a heat storage to be (Continued)

heated by the first fluid, and heat second fluid with heat stored in the heat storage. The system further includes a generator to generate electric power by using the second fluid, a heating controller to control heating of the first fluid by the heater, and a power generation controller to control power generation performed by the generator. The heating controller controls the heating of the first fluid, based on two or more limit values among a first limit value related to an amount of energy consumption by the heater, a second limit value related to temperature of the first fluid, a third limit value related to internal temperature of the heat storage, and a fourth limit value related to a change rate of the internal temperature.

15 Claims, 26 Drawing Sheets

(56) References Cited

U.S. PATENT DOCUMENTS

| | | | | |
|---|---|---|---|---|
| 2005/0022963 | A1* | 2/2005 | Garrabrant | F25B 27/02<br>165/58 |
| 2008/0066736 | A1 | 3/2008 | Zhu | |
| 2008/0219651 | A1* | 9/2008 | Nayef | F24H 7/0208<br>392/485 |
| 2018/0016984 | A1 | 1/2018 | Deleau et al. | |
| 2019/0063264 | A1* | 2/2019 | Lee | F01K 9/003 |
| 2025/0314431 | A1 | 10/2025 | Matsuzaki et al. | |

FOREIGN PATENT DOCUMENTS

| | | | |
|---|---|---|---|
| EP | 3 327 399 | B1 | 5/2018 |
| EP | 3 322 955 | B1 | 6/2019 |
| JP | S55-089601 | A | 7/1980 |
| JP | H08-247671 | A | 9/1996 |
| JP | H11-211370 | A | 8/1999 |
| JP | 2001-280871 | A | 10/2001 |
| JP | 2011-129433 | A | 6/2011 |
| JP | 2011-169171 | A | 9/2011 |
| JP | 2011-169187 | A | 9/2011 |
| JP | 2016-217663 | A | 12/2016 |
| JP | 2021-040411 | A | 3/2021 |
| JP | 2022-158322 | A | 10/2022 |
| JP | 2023-000372 | A | 1/2023 |
| WO | WO-2016/050365 | A1 | 4/2016 |
| WO | WO-2016/150462 | A1 | 9/2016 |
| WO | WO-2017/055440 | A1 | 4/2017 |
| WO | WO-2017/055472 | A1 | 4/2017 |

OTHER PUBLICATIONS

Jawhar et al., Thermal Energy Storage Options for Concentrated Solar Power Plants in the United Arab Emirates, 2020, IEEE, p. 1-6 (Year: 2020).*

Patel et al., Sensible Heat Storage for Power Generation, 2013, IEEE, p. 1-4 (Year: 2013).*

Cabeza et al., Review of Solar Thermal Storage Techniques and Associated Heat Transfer Technologies, 2012, IEEE, p. 1-14 (Year: 2012).*

U.S. Appl. No. 18/570,996, filed Dec. 15, 2023.

International Preliminary Report on Patentability for Appl. Ser. No. PCT/JP2021/043877 mail date Dec. 28, 2023 (7 pages).

U.S. Appl. No. 18/274,413, filed Jul. 26, 2023.

International Search Report and Written Opinion in corresponding PCT Application No. PCT/JP2021/043877 dated Jan. 11, 2022, with partial English translation.

International Preliminary Report on Patentability for Appl. Ser. No. PCT/JP2021/043872 date received: Dec. 28, 2023 (5 pages).

International Search Report and Written Opinion in corresponding PCT Application No. PCT/JP2021/043872 dated Feb. 22, 2022, with partial English translation (8 pages).

JP Office Action for JP Appl. Ser. No. 2021-101143 dated Mar. 28, 2025 (6 pages).

* cited by examiner

| TIME t | LIMIT V. ya |
|---|---|
| 0 | 30 |
| 100 | 30 |
| 101 | 55 |
| 200 | 55 |
| 201 | 35 |
| 300 | 15 |
| 301 | 15 |
| 400 | 5 |
| 401 | 5 |
| 500 | 5 |

PROCESS MODEL

TEMP. CHNG. MODEL FORMULA OF HEAT STORAGE $$\frac{d}{dt}T_s(x,t) = f_1(T_s(x,t), T_a(x,t), F_a(t))$$

TEMP. CHNG MODEL FORMULA OF HEAT TRANSFER FLUID IN HEAT STORAGE $$\frac{d}{dt}T_a(x,t) = f_2(T_s(x,t), T_a(x,t), F_a(t))$$

TEMP. CHNG. MODEL FORMULA OF HEAT TRANSFER FLUID OUTPUT FROM HEATER $$\frac{d}{dt}T_a(x_0,t) = f_3(T_a(x_n,t), F_a(t), Q_a(t))$$

F. R. CHNG. MODEL FORMULA OF HEAT TRANSFER FLUID OUTPUT FROM HEATER $$\frac{d}{dt}F_a(t) = f_4(F_a(t), u_{Fa}(t))$$

EVALUATING FUNCTION $$J = t_m$$

CONSTRAINT CONDITION EXPRESSIONS.

$$\max(T_s(x,t)) \leq T_{smax}$$

$$\frac{d}{dt}T_s(x_1,t) \leq T_{sdmax}$$

$$\max(T_a(x_0,t)) \leq T_{amax}$$

FIG. 22

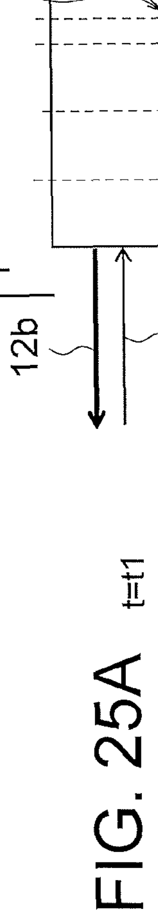
FIG. 25A t=t1
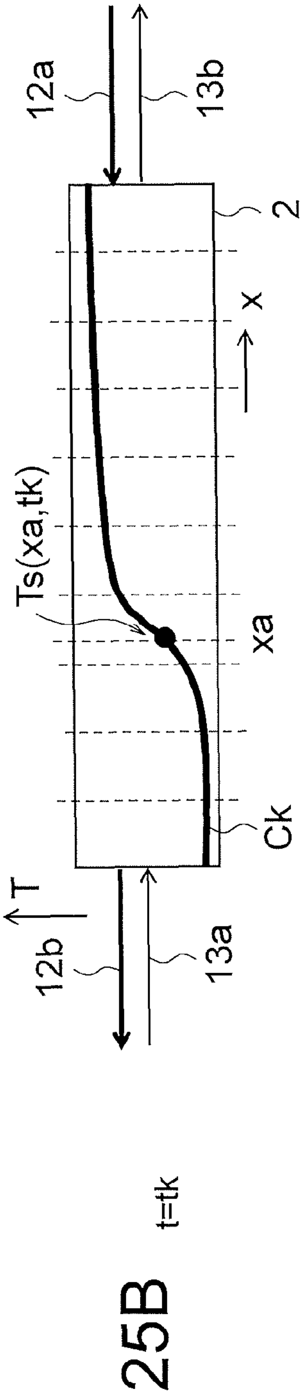
FIG. 25B t=tk
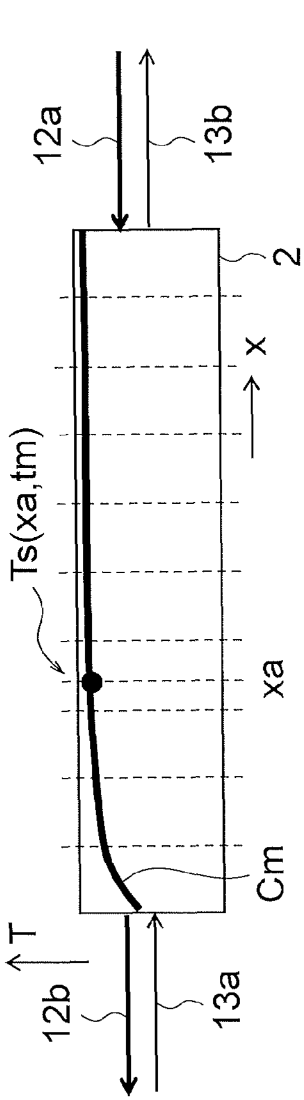
FIG. 25C t=tm

HEAT STORAGE POWER GENERATION SYSTEM AND POWER GENERATION CONTROL SYSTEM

CROSS REFERENCE TO RELATED APPLICATION

This application is based upon and claims the benefit of priority from the prior Japanese Patent Application No. 2021-101137, filed on Jun. 17, 2021 and the prior International Patent Application No. PCT/JP2021/043877, filed on Nov. 30, 2021, the entire contents of which are incorporated herein by reference.

FIELD

Embodiments described herein relate to a heat storage power generation system and a power generation control system.

BACKGROUND

Various heat storage power generation systems have been proposed. A heat storage power generation system includes a heat storage including a heat storage material, and a power generator configured to generate electric power by using heat stored in the heat storage material.

For example, technologies of managing the temperature of heat transfer fluid transferred from the heat storage to the power generator and technologies of setting the gradient of distribution of the internal temperature of the heat storage to a desired gradient have been proposed. In addition, technologies of managing the amount of energy that heats the heat storage material to a constant value by measuring the temperature of the heat transfer fluid upstream of the entrance of the heat storage and downstream of the exit thereof when the heat storage is operated in a heat storing mode have been proposed. Furthermore, technologies that the power generator generates electric power by using a steam turbine cycle when the heat storage is operated in a heat releasing mode have been proposed.

In the heat storing mode, the heat storage material in the heat storage is heated by some means, for example, the heat transfer fluid at high temperature. Then, as the temperature of the heat storage material increases, energy is stored in the heat storage. The heat transfer fluid at high temperature is produced by, for example, electric power generated by using natural energy. The electric power is surplus electric power that exceeds electric power needed by, for example, an electric power system.

In the heat releasing mode, the heat storage material in the heat storage releases heat to some means, for example, the heat transfer fluid at low temperature. The heat transfer fluid at low temperature is heated by receiving thermal energy from the heat storage material. Accordingly, thermal energy in the heat storage material decreases. The heat transfer fluid heated in the heat storage is transferred to the power generator and supplies thermal energy to the steam turbine cycle in the power generator. The power generator generates electric power by using the thermal energy.

BRIEF DESCRIPTION OF THE DRAWINGS

FIG. 21 is a diagram for description of a process model of the third embodiment;

FIG. 22 is a diagram for description of an evaluating function and a constraint conditional expression of a fourth embodiment;

FIGS. 25A to 25C are schematic diagrams for description of internal temperature Ts(xa, tk) of a heat storage of the fifth embodiment.

DETAILED DESCRIPTION

Embodiments will now be explained with reference to the accompanying drawings. In FIGS. 1 to 26, identical components are denoted by the same reference sign and duplicate description thereof is omitted.

A heat storage material in a heat storage is, for example, a crushed rock. When the crushed rock in the heat storage is exposed to heat transfer fluid at high temperature (for example, 800° C.) in a heat storing mode, thermal expansion and thermal contraction occur in the crushed rock. Heat shock attributable to them may crush the crushed rock further finely. In this case, the crushed rocks sink downward due to crushing, and accordingly, the crushed rocks gather in the lower region of a space in the heat storage and gaps are generated in the upper region of the space in the heat storage. As a result, the heat transfer fluid does not pass through the lower region but passes through the upper region in the heat storing mode and a heat releasing mode, so that heat may not suitably be exchanged between the heat transfer fluid and the crushed rocks.

To avoid this, technologies addressing the heat exchange problem on a premise that crushed rocks are crushed in this manner have been proposed. For example, in a proposed technology, the upper region in the heat storage is filled with some means so that the heat transfer fluid passes through the lower region in the heat storage. However, problems with this technology are that crushing of crushed rocks is not preferable and that an additional work is needed to fill the upper region.

In one embodiment, a heat storage power generation system includes a heater configured to heat first heat transfer fluid, and a heat storage including a heat storage material heated by the first heat transfer fluid, and configured to heat second heat transfer fluid with heat stored in the heat storage material. The system further includes a power generator configured to generate electric power by using the second heat transfer fluid, a heating controller configured to control heating of the first heat transfer fluid by the heater, and a power generation controller configured to control power generation performed by the power generator. The heating controller controls the heating of the first heat transfer fluid, based on two or more limit values among a first limit value related to an amount of energy consumption by the heater, a second limit value related to temperature of the first heat transfer fluid, a third limit value related to internal temperature of the heat storage, and a fourth limit value related to a change rate of the internal temperature.

First Embodiment

[A] Overall Configuration

Figure 1:
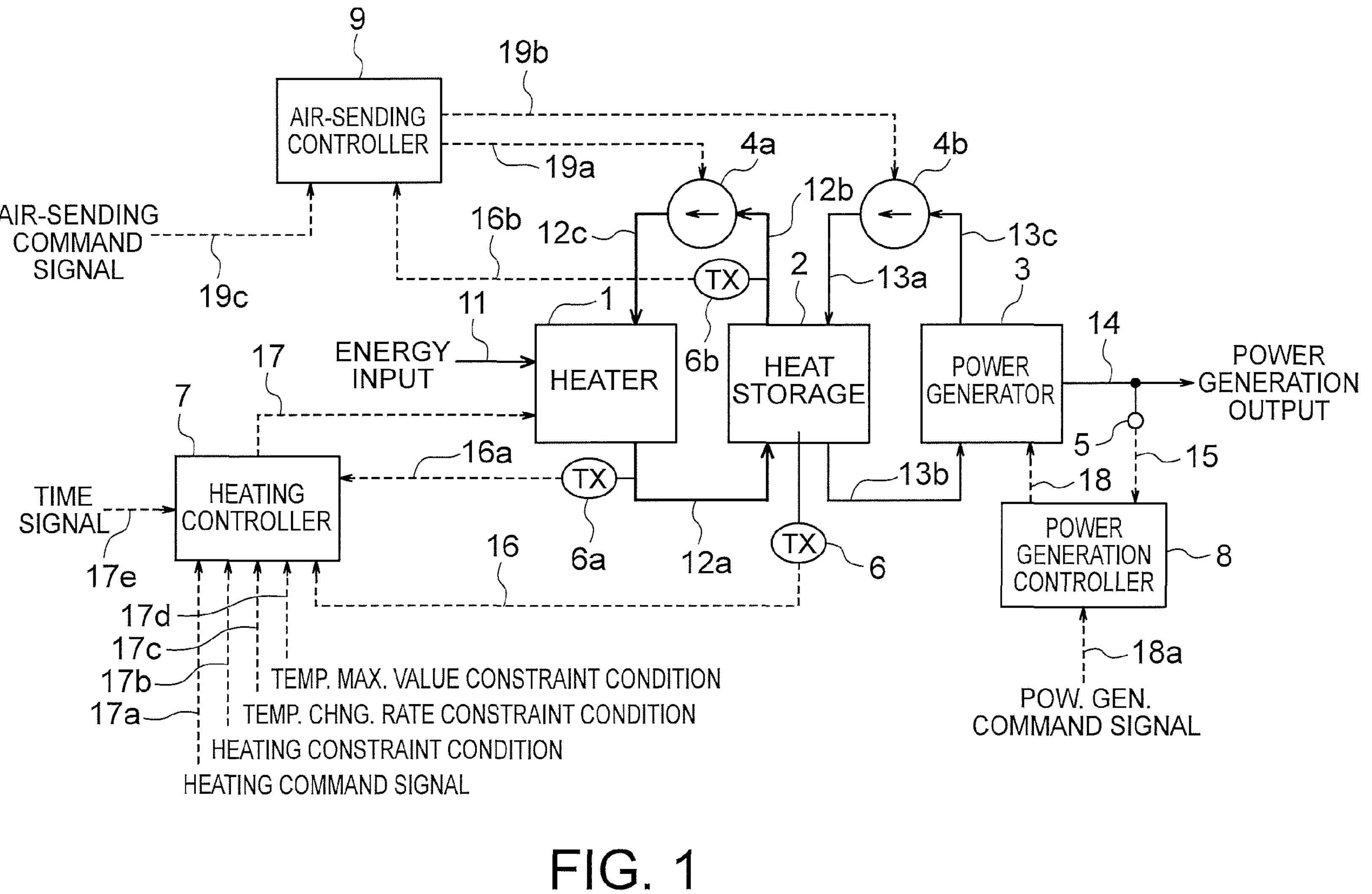
FIG. 1 is a schematic diagram illustrating the configuration of a heat storage power generation system of a first embodiment.

FIG. 1 is a schematic diagram illustrating the configuration of a heat storage power generation system of a first embodiment.

The heat storage power generation system of the present embodiment includes a heater 1, a heat storage 2, a power generator 3, a first air sender 4*a*, a second air sender 4*b*, a power generation output meter 5, temperature meters 6, 6*a*, and 6*b*, a heating controller 7, a power generation controller 8, and an air-sending controller 9. The power generation output meter 5, the temperature meters 6, 6*a*, and 6*b*, the heating controller 7, the power generation controller 8, and the air-sending controller 9 constitute a power generation control system that controls the heat storage power generation system of the present embodiment.

[A-1] Heater 1

The heater 1 of the present embodiment receives electric power as energy input 11 and converts the electric power into heat by using a heat generating source such as an electric heater. In addition, the heater 1 of the present embodiment heats heat transfer fluid 12*c* at low temperature by using the heat and generates heat transfer fluid 12*a* at high temperature. The heater 1 may convert energy other than electric power into heat. For example, the heat transfer fluids denoted by reference signs 12*a* and 12*c* are examples of first heat transfer fluid.

[A-2] Heat Storage 2

The heat storage 2 includes a heat storage material (not illustrated) and can store heat in the heat storage material. The heat storage material is, for example, a crushed rock. The heat storage 2 of the present embodiment is operated in the heat storing mode or the heat releasing mode.

In the heat storing mode, the heat transfer fluid 12*a* at high temperature enters the heat storage 2. The heat storage material in the heat storage 2 is heated by the heat transfer fluid 12*a*. Accordingly, the temperature of the heat storage material rises. Simultaneously, the temperature of the heat transfer fluid 12*a* falls, and the heat transfer fluid 12*a* becomes heat transfer fluid 12*b* at low temperature and is discharged to the outside of the heat storage 2. In this manner, in the heat storing mode, thermal energy is stored in the heat storage 2 as the temperature of the heat storage material in the heat storage 2 rises.

In the heat releasing mode, heat transfer fluid 13*a* at low temperature enters the heat storage 2. Heat of the heat storage material in the heat storage 2 is absorbed by the heat transfer fluid 13*a*, in other words, the heat storage material releases heat to the heat transfer fluid 13*a*. Accordingly, the temperature of the heat storage material falls. Simultaneously, the temperature of the heat transfer fluid 13*a* rises, and the heat transfer fluid 13*a* becomes heat transfer fluid 13*b* at high temperature and is discharged to the outside of the heat storage 2. In this manner, in the heat releasing mode, the temperature of the heat storage material falls as the heat storage material in the heat storage 2 discharges thermal energy. For example, the heat transfer fluids denoted by reference signs 13*a* and 13*b* are examples of second heat transfer fluid.

The heat transfer fluid 12*a* flows from the lower side to the upper side in the heat storage 2 in illustration of FIG. 1, but in reality, does not necessarily need to flow from the lower side to the upper side and may flow, for example, from the uppers side to the lower side, from the right side to the left side, or from the left side to the right side. Similarly, the heat transfer fluid 13*a* flows from the uppers side to the lower side in the heat storage 2 in illustration of FIG. 1, but in reality, does not necessarily need to flow from the uppers side to the lower side and may flow, for example, from the lower side to the upper side, from the left side to the right side, or from the right side to the left side. FIG. 1 schematically illustrates the directions in which the heat transfer fluid 12*a*, the heat transfer fluid 13*a*, and the like flow.

[A-3] Power Generator 3

The power generator 3 generates electric power by using heat of the heat transfer fluid 13*b* at high temperature. The power generator 3 of the present embodiment includes a steam turbine, an electric generator, a heat exchanger, a steam condenser, and the like that constitute a steam turbine cycle. In this case, the power generator 3 generates steam from water with heat of the heat transfer fluid 13*b*, drives the steam turbine with the steam, drives the electric generator with the steam turbine, and generates electric power with the electric generator. FIG. 1 illustrates power generation output 14 from the power generator 3. Simultaneously, the temperature of the heat transfer fluid 13*b* falls, and the heat transfer fluid 13*b* becomes heat transfer fluid 13*c* at low temperature and is discharged to the outside of the power generator 3. The power generator 3 may generate electric power by using heat of the heat transfer fluid 13*b* in any other manner than the steam turbine cycle.

[A-4] First Air Sender 4*a* and Second Air Sender 4*b*

The first air sender 4*a* is used to cause the heat transfer fluid 12*b* discharged from the heat storage 2 to flow to the heater 1. In FIG. 1, heat transfer fluid flowing toward the first air sender 4*a* is denoted by reference sign 12*b*, and heat transfer fluid having passed through the first air sender 4*a* is denoted by reference sign 12*c*. The heat transfer fluid 12*c* enters the heater 1, is heated in the heater 1 to become the heat transfer fluid 12*a* at high temperature, and is discharged to the outside of the heater 1. In this manner, the first air sender 4*a* distributes (circulates) the heat transfer fluids 12*a*, 12*b*, and 12*c* between the heater 1 and the heat storage 2.

The second air sender 4*b* is used to cause the heat transfer fluid 13*c* discharged from the power generator 3 to flow to the heat storage 2. In FIG. 1, heat transfer fluid flowing toward the second air sender 4*b* is denoted by reference sign 13*c*, and heat transfer fluid having passed through the second air sender 4*b* is denoted by reference sign 13*a*. The heat transfer fluid 13*a* enters the heat storage 2, is heated in the heat storage 2 to become the heat transfer fluid 13*b* at high temperature, and is discharged to the outside of the heat storage 2. In this manner, the second air sender 4*b* distributes (circulates) the heat transfer fluids 13*a*, 13*b*, and 13*c* between the heat storage 2 and the power generator 3.

Depending on an operation purpose, the first air sender 4*a* causes the heat transfer fluid 12*c* to flow to the heater 1 at a constant flow rate or controls the flow rate of the heat transfer fluid 12*c* to a flow rate set value that varies. Similarly, depending on an operation purpose, the second air sender 4*b* causes the heat transfer fluid 13*a* to flow to the heat storage 2 at a constant flow rate or controls the flow rate of the heat transfer fluid 13*a* to a flow rate set value that varies. In any case, operation of the first air sender 4*a* and the second air sender 4*b* is controlled by the air-sending controller 9.

The heat storage power generation system of the present embodiment may include a single air sender configured to cause the heat transfer fluid 12*c* to flow to the heater 1 and cause the heat transfer fluid 13*a* to flow to the heat storage 2 instead the first air sender 4*a* configured to cause the heat transfer fluid 12*c* to flow to the heater 1 and the second air sender 4*b* configured to cause the heat transfer fluid 13*a* to flow to the heat storage 2. In this case, the single air sender may include a switching device configured to switch between an air-sending path for the heat transfer fluid 12*c* and an air-sending path for the heat transfer fluid 13*a*.

[A-5] Power Generation Output Meter 5

The power generation output meter 5 measures the power generation output 14 from the power generator 3 and outputs a power generation output measurement signal 15 indicating a result of the measurement of the power generation output 14. The measurement result of the power generation output 14 is, for example, an MW value of electric power output from the power generator 3. The power generation output measurement signal 15 of the present embodiment is input to the power generation controller 8.

[A-6] Temperature Meters 6, 6*a*, and 6*b*

The temperature meter 6 measures the internal temperature of the heat storage 2 and outputs a temperature measurement signal 16 indicating a result of the measurement of the internal temperature. The internal temperature of the heat storage 2 is temperature inside the heat storage 2. The temperature meter 6 of the present embodiment includes, for example, a temperature detector inserted into the heat storage material of the heat storage 2 and measures, as the internal temperature of the heat storage 2, the temperature of the heat storage material or the temperature of air or heat transfer fluid contained in the heat storage material. The temperature meter 6 of the present embodiment measures the internal temperature near the entrance of the heat storage 2 through which the heat transfer fluid 12*a* flows into the heat storage 2. The measurement result of the internal temperature is, for example, the value of the internal temperature measured by the heat storage 2. The temperature measurement signal 16 of the present embodiment is input to the heating controller 7.

The temperature meter 6*a* measures the temperature of the heat transfer fluid 12*a* upstream of the entrance of the heat storage 2 and outputs a temperature measurement signal 16*a* indicating a result of the measurement of the temperature of the heat transfer fluid 12*a*. The measurement result of the temperature of the heat transfer fluid 12*a* is, for example, the value of the temperature of the heat transfer fluid 12*a* measured by the heat storage 2. The temperature measurement signal 16*a* of the present embodiment is input to the heating controller 7.

The temperature meter 6*b* measures the temperature of the heat transfer fluid 12*b* downstream of the exit of the heat storage 2 and outputs a temperature measurement signal 16*b* indicating a result of the measurement the temperature of the heat transfer fluid 12*b*. The measurement result of the temperature of the heat transfer fluid 12*b* is, for example, the value of the temperature of the heat transfer fluid 12*b* measured by the heat storage 2. The temperature measurement signal 16*b* of the present embodiment is input to the air-sending controller 9.

Disposition of the temperature meters 6, 6*a*, and 6*b* of the present embodiment will be described later in Section [B]. The temperature meters 6, 6*a*, and 6*b* measure temperature by using a thermocouple in the present embodiment but may measure temperature by any other method (for example, an infrared measurement method). In a case in which it is difficult to directly measure the internal temperature of the heat storage 2 and the temperatures of the heat transfer fluids 12*a* and 12*b*, the temperature meters 6, 6*a*, and 6*b* may be software sensors using an observer theory, a simulator, or the like.

[A-7] Heating Controller 7

The heating controller 7 receives the temperature measurement signals 16 and 16*a*, a heating command signal 17*a*, a heating constraint condition 17*b*, a temperature change rate constraint condition 17*c*, a temperature maximum value constraint condition 17*d*, and a time signal 17*e* and outputs a heating control signal 17 based on the received signals and conditions. In this manner, the heating controller 7 controls heating of the heat transfer fluid 12*c* by the heater 1. The heating controller 7 controls operation of the heater 1 so that, for example, the amount of energy consumption by the heater 1 or the temperature of the heat transfer fluid 12*a* becomes equal to a desired value.

Further details of the configuration and function of the heating controller 7 of the present embodiment will be described later in Section [C].

[A-8] Power Generation Controller 8

The power generation controller 8 receives the power generation output measurement signal 15 and a power generation command signal 18*a* and outputs a power generation control signal 18 based on the received signals. Specifically, the power generation controller 8 outputs the power generation control signal 18 to the power generator 3 to match a set value of the power generation output 14 indicated by the power generation command signal 18*a* and a measured value of the power generation output 14 indicated by the power generation output measurement signal 15. For example, in a case in which the measured value is higher than the set value, the power generation control signal 18 that decreases the power generation output 14 is output. In a case in which the measured value is lower than the set value, the power generation control signal 18 that increases the power generation output 14 is output. In this manner, the power generation controller 8 controls power generation performed by the power generator 3.

To control the power generator 3 as described above, for example, the power generation controller 8 measures various process amounts that are internal information of the power generator 3, and operates various operation ends in the power generator 3 based on the process amounts. The process amounts are, for example, the pressures, temperatures, and flow rates of heat transfer fluid, steam, and water. The operation ends are, for example, valves and pumps. The power generation controller 8 performs the control to match the set value and measured value of the power generation output 14 by, for example, proportional-integral-derivative (PID) control.

[A-9] Air-Sending Controller 9

The air-sending controller 9 receives the temperature measurement signal 16*b* and an air-sending command signal 19*c* and outputs air-sending control signals 19*a* and 19*b* based on the received signals. Specifically, the air-sending controller 9 controls operation of the first air sender 4*a* by using the first air-sending control signal 19*a* and controls operation of the second air sender 4*b* by using the second air-sending control signal 19*b*. The air-sending controller 9 can control distribution of the heat transfer fluids 12*a* to 12*c* between the heater 1 and the heat storage 2 by using the first air-sending control signal 19*a* and can control distribution of the heat transfer fluids 13*a* to 13*c* between the heat storage 2 and the power generator 3 by using the second air-sending control signal 19*b*.

Further details of the configuration and function of the air-sending controller 9 of the present embodiment will be described later in Section [D].

[B] Disposition of Temperature Meters 6, 6*a*, and 6*b*

Figure 2:
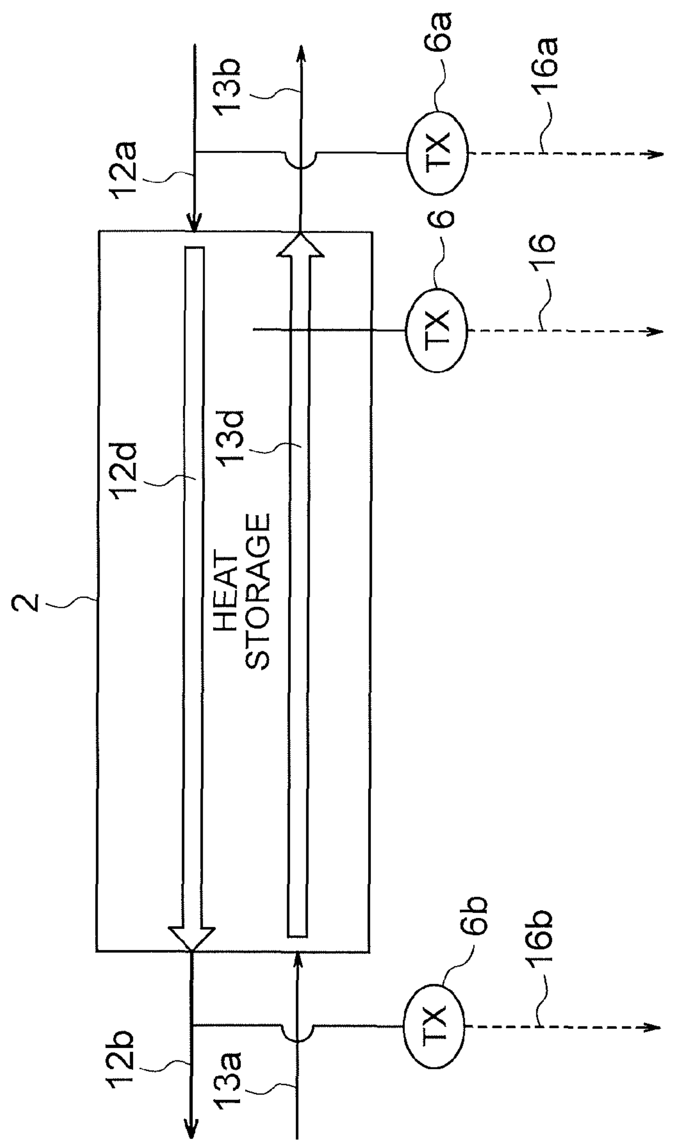
FIG. 2 is a schematic diagram illustrating disposition of a temperature meter of the first embodiment.

FIG. 2 is a schematic diagram illustrating disposition of the temperature meters 6, 6*a*, and 6*b* of the first embodiment.

FIG. 2 illustrates the temperature meters 6, 6*a*, and 6*b*. The temperature meter 6 measures the internal temperature of the heat storage 2 near the entrance of the heat storage 2 through which the heat transfer fluid 12*a* flows into the heat storage 2, and outputs the temperature measurement signal 16 indicating a result of the measurement of the internal temperature to the heating controller 7. The temperature meter 6*a* measures the temperature of the heat transfer fluid 12*a* upstream of the entrance of the heat storage 2 and outputs the temperature measurement signal 16*a* indicating a result of the measurement of the temperature of the heat transfer fluid 12*a* to the heating controller 7. The temperature meter 6*b* measures the temperature of the heat transfer fluid 12*b* downstream of the exit of the heat storage 2 and outputs the temperature measurement signal 16*b* indicating a result of the measurement of the temperature of the heat transfer fluid 12*b* to the air-sending controller 9.

FIG. 2 illustrates installation places of the temperature meters 6, 6*a*, and 6*b*. In a case in which the heat storage 2 illustrated in FIG. 2 is in the heat storing mode, the heat transfer fluid 12*a* at high temperature enters the heat storage 2 from the right side, is cooled by the heat storage 2 to become the heat transfer fluid 12*b* at low temperature, and is output to the left side of the heat storage 2. In FIG. 2, heat transfer fluid flowing inside the heat storage 2 in the heat storing mode is denoted by reference sign 12*d*. In a case in which the heat storage 2 illustrated in FIG. 2 is in the heat releasing mode, the heat transfer fluid 13*a* at low temperature enters the heat storage 2 from the left side, is heated by the heat storage 2 to become the heat transfer fluid 13*b* at high temperature, and is output to the right side of the heat storage 2. In FIG. 2, heat transfer fluid flowing inside the heat storage 2 in the heat releasing mode is denoted by reference sign 13*d*.

The temperature meter 6 of the present embodiment is used to measure the internal temperature of the heat storage 2 in the heat storing mode. The internal temperature at a place in the heat storage 2 and the internal temperature at another place in the heat storage 2 typically have different values even at the same time. In other words, distribution of the internal temperature in the heat storage 2 is typically non-uniform. The temperature at places in the heat storage 2 changes from moment to moment as time elapses. The temperature meter 6 of the present embodiment is disposed near the entrance of the heat storage 2 through which the heat transfer fluid 12*a* flows into the heat storage 2, and measures the internal temperature of the heat storage 2 near the entrance of the heat storage 2 as described above.

The heat storage power generation system of the present embodiment may include a plurality of temperature meters 6 configured to measure the internal temperature of the heat storage 2. With the increased number of temperature meters 6, it is possible to highly accurately measure distribution of the internal temperature in the heat storage 2. In this case, for example, the temperature meters 6 are disposed alongside in the flowing directions of the heat transfer fluid 12*d* and the heat transfer fluid 13*d*, in other words, disposed alongside each other in the right-left direction. In a case in which an x direction is defined to be the direction from the left side to the right side in FIG. 2, only one temperature meter 6 is disposed at one x coordinate.

However, the temperature meters 6 may be disposed in a manner different from the above-described disposition. For example, two or more temperature meters 6 may be disposed at shifted installation places at one x coordinate. With this configuration, it is possible to measure not only one-dimensional internal temperature distribution in the x direction but also two-dimensional or three-dimensional internal temperature distribution. For example, in a case in which a y direction and a z direction are defined to be two directions orthogonal to the x direction, it is possible to measure three-dimensional internal temperature distribution by disposing the above-described plurality of temperature meters 6 in a three-dimensional array in the x, y, and z directions. The x, y, and z directions are, for example, the lateral direction, the longitudinal direction, and the depth direction in the heat storage 2.

The installation place of each temperature meter 6 in Section [B] means the installation place of the temperature detector of the temperature meter 6. For example, in a case in which a temperature meter 6 detects the internal temperature of the heat storage 2 at the position of a terminal, the installation place of the temperature meter 6 means the position of the terminal. This is the same for the temperature meters 6*a* and 6*b*.

[C] Configuration and Function of Heating Controller 7

Figure 3:
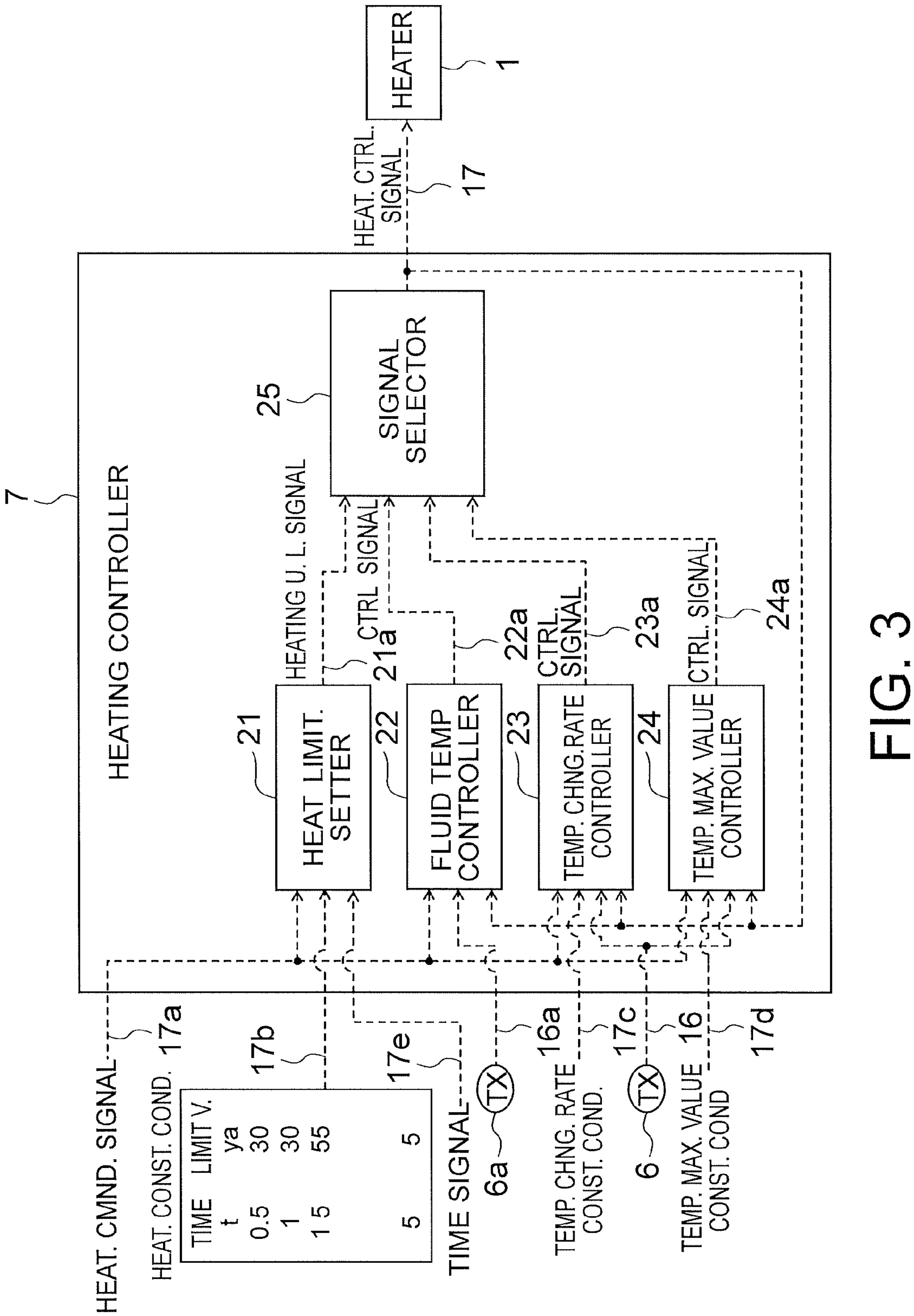
FIG. 3 is a schematic diagram illustrating the configuration of a heating controller of the first embodiment.

FIG. 3 is a schematic diagram illustrating the configuration of the heating controller 7 of the first embodiment.

The heating controller 7 of the present embodiment includes a heating limitation setter 21, a fluid temperature controller 22, a temperature change rate controller 23, a temperature maximum value controller 24, and a signal selector 25. As described above, the heating controller 7 receives the temperature measurement signals 16 and 16*a*, the heating command signal 17*a*, the heating constraint condition 17*b*, the temperature change rate constraint condition 17*c*, the temperature maximum value constraint condition 17*d*, and the time signal 17*e* and outputs the heating control signal 17. FIG. 3 additionally illustrates a heating upper limit signal 21*a* output from the heating limitation setter 21, a control signal 22*a* output from the fluid temperature controller 22, a control signal 23*a* output from the temperature change rate controller 23, and a control signal 24*a* output from the temperature maximum value controller 24.

The heating command signal 17*a* is a single signal having the value of "True" or "False". The value of the heating command signal 17*a* becomes "True" at start of operation in the heat storing mode and becomes "False" at end of operation in the heat storing mode. In the present embodiment, start and end of the heat storing mode can be controlled by the heating command signal 17*a*.

The heating constraint condition 17*b* is table data including combinations of a numerical value indicating time (t) and a numerical value indicating a limit value (ya) and is input from the outside before start of control calculation. The numerical value indicating the limit value indicates a limit value related to the amount of energy consumption by the heater 1 at each time. Accordingly, the limit value related to the amount of energy consumption by the heater 1 changes in accordance with time (refer to FIGS. 3 and 4). In the present embodiment, the amount of energy consumption by the heater 1 can be limited by the heating constraint condition 17*b*.

The temperature change rate constraint condition 17*c* is a single numerical value for limiting the change rate of the internal temperature of the heat storage 2 and is input from the outside before start of control calculation. The temperature change rate constraint condition 17*c* of the present embodiment is used to limit the change rate of the internal temperature near the entrance of the heat storage 2. In the present embodiment, the change rate of the internal temperature of the heat storage 2 can be limited by the temperature change rate constraint condition 17*c*. The numerical value of the temperature change rate constraint condition 17*c* input to the heating controller 7 of the present embodiment may change in accordance with time. In this case, a value in accordance with time is input from the outside as the numerical value of the temperature change rate constraint condition 17*c* but is a constant value in the present embodiment to facilitate description.

The temperature maximum value constraint condition 17*d* is a single numerical value for limiting the maximum value of the internal temperature of the heat storage 2 and is input from the outside before start of control calculation. The temperature maximum value constraint condition 17*d* of the present embodiment is used to limit the maximum value of the internal temperature near the entrance of the heat storage 2. In the present embodiment, the maximum value of the internal temperature of the heat storage 2 can be limited by the temperature maximum value constraint condition 17*d*. The numerical value of the temperature maximum value constraint condition 17*d* input to the heating controller 7 of the present embodiment may change in accordance with time. In this case, a value in accordance with time is input from the outside as the numerical value of the temperature maximum value constraint condition 17*d* but is a constant value in the present embodiment to facilitate description. The heating controller 7 may use, in place of the temperature maximum value constraint condition 17*d*, a condition for limiting any other value of the internal temperature of the heat storage 2.

The time signal 17*e* is a signal for determining time. The time signal 17*e* of the present embodiment is used together with the heating command signal 17*a* to determine the limit value related to the amount of energy consumption by the heater 1 at each time.

Constituent components included in the heating controller 7 will be described below.

[C-1] Heating Limitation Setter 21

Figure 4:
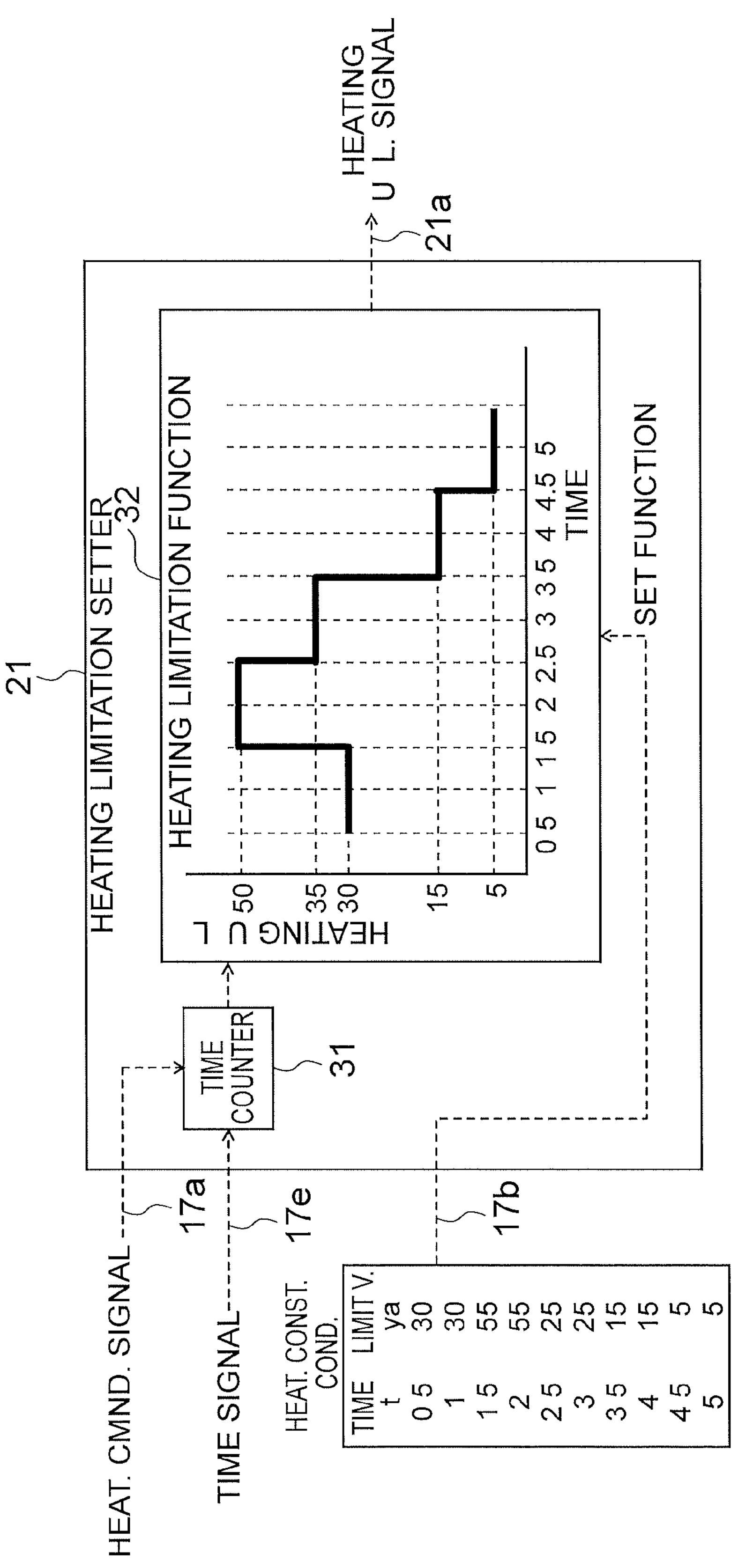
FIG. 4 is a schematic diagram illustrating the configuration of a heating limitation setter of the first embodiment.

FIG. 4 is a schematic diagram illustrating the configuration of the heating limitation setter 21 of the first embodiment.

The heating limitation setter 21 receives the heating command signal 17*a*, the time signal 17*e*, and the heating constraint condition 17*b* and outputs the heating upper limit signal 21*a*. The heating limitation setter 21 includes a time counter 31 and a heating limitation function 32.

The time counter 31 receives the heating command signal 17*a* and the time signal 17*e*. In addition, the time counter 31 sets "time 0" to be a time at which the heating command signal 17*a* is received, and outputs, to the heating limitation function 32, time information indicating current time that is elapsed time since time 0.

The heating limitation function 32 is function data set by using the heating constraint condition 17*b*. When the time information from the time counter 31 is input to the heating limitation function 32, the heating limitation function 32 outputs the limit value (ya) corresponding to current time (t) indicated by the time information. In this manner, the heating limitation function 32 outputs the heating upper limit signal 21*a* having a limit value that changes in accordance with time to the outside of the heating limitation setter 21. The limit value of the heating upper limit signal 21*a* is an example of a first limit value related to the amount of energy consumption by the heater.

The limit value of the heating upper limit signal 21*a* is, for example, the upper limit value of the amount of energy consumption that the heater 1 is allowed to consume in a constant time period since a certain time. In the present embodiment, the upper limit value of the amount of energy consumption is required not to exceed an energy input amount input to the heater 1 by the energy input 11. In a case in which the energy input 11 includes renewable energy, the energy input amount may largely be affected by weather and the like. For this reason, the upper limit value of the amount of energy consumption needs to be decreased in some cases in which the energy input amount is expected to decrease.

[C-2] Fluid Temperature Controller 22

Figure 5:
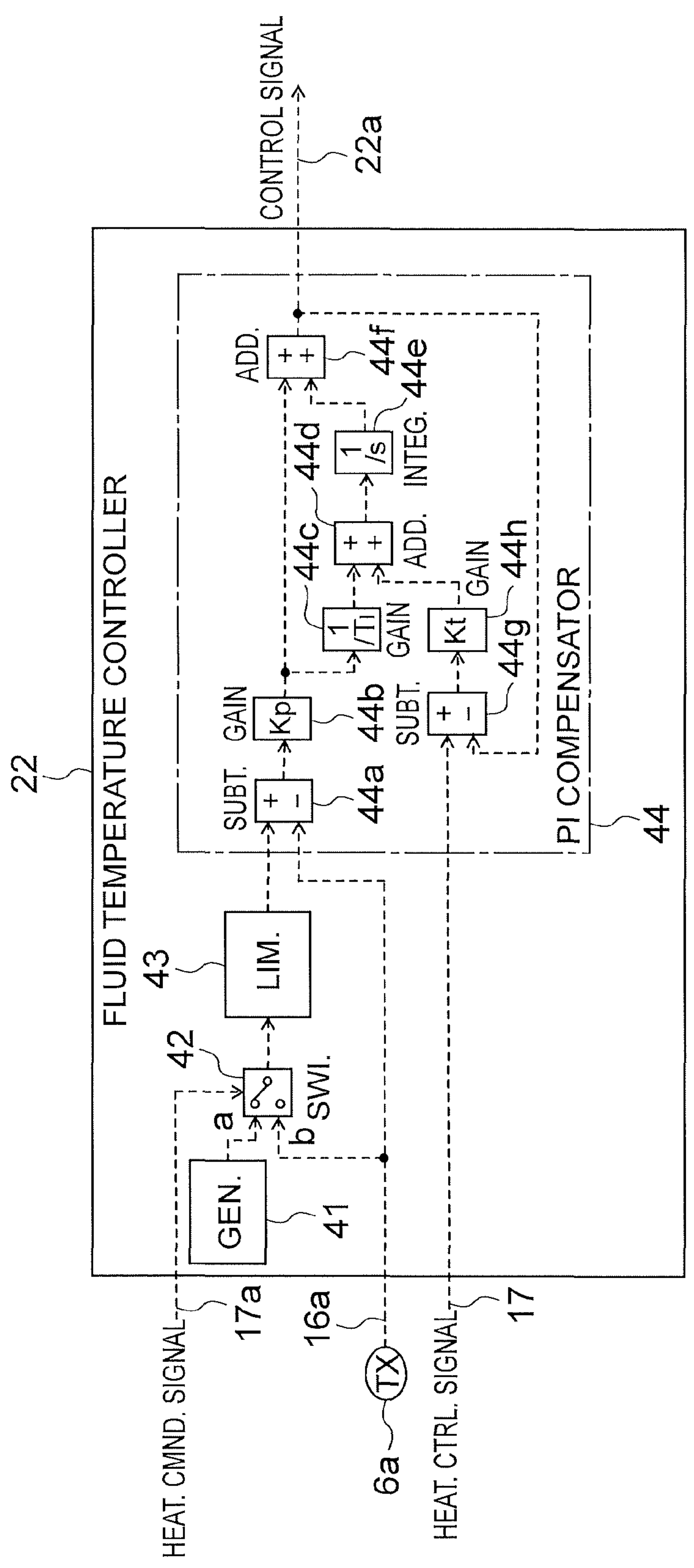
FIG. 5 is a schematic diagram illustrating the configuration of a fluid temperature controller of the first embodiment.

FIG. 5 is a schematic diagram illustrating the configuration of the fluid temperature controller 22 of the first embodiment.

The fluid temperature controller 22 receives the heating command signal 17*a*, the temperature measurement signal 16*a*, and the heating control signal 17 and outputs the control signal 22*a*. The fluid temperature controller 22 includes a signal generator 41, a switcher 42, a change rate limiter 43, and a proportional-integral (PI) compensator 44.

The signal generator 41 continuously outputs a numerical value set in advance. In the present embodiment, a numerical value for limiting the temperature of the heat transfer fluid 12*a* is set in the signal generator 41 in advance, and an output signal having the numerical value is continuously output from the signal generator 41.

The switcher 42 includes an input terminal "a" to which an output signal from the signal generator 41 is input, an input terminal "b" to which the temperature measurement signal 16*a* from the temperature meter 6*a* is input, and a control terminal to which the heating command signal 17*a* is input. When the heating command signal 17*a* has the value of "True", the switcher 42 outputs the "a" side value. When the heating command signal 17*a* has the value of "False", the switcher 42 outputs the "b" side value.

The change rate limiter 43 converts an input signal from the switcher 42 into a signal that changes in accordance with a constant change rate set in advance, and outputs the converted signal to the PI compensator 44.

The PI compensator 44 includes a subtractor 44*a*, a gain setter 44*b*, a gain setter 44*c*, an adder 44*d*, an integrator 44*e*, an adder 44*f*, a subtractor 44*g*, and a gain setter 44*h*.

The subtractor 44*a* receives the above-described converted signal (set value) from the change rate limiter 43 and receives the temperature measurement signal 16*a* (process value) from the temperature meter 6*a*. The PI compensator 44 performs compensation operation by setting an appropriate numerical value to each of the gain setters 44*b*, 44*c*, and 44*h* so that the difference between the set value and the process value is zero. Specifically, the PI compensator 44 outputs the control signal 22*a* with which the difference between each set value and the process value becomes closer to zero. The subtractor 44*a*, the integrator 44*e*, and the adder 44*f* perform subtraction, integration, and addition, respectively, for PI compensation.

The subtractor 44*g* receives the control signal 22*a* and the heating control signal 17 and outputs a result of subtraction between the control signal 22*a* and the heating control signal 17 to the gain setter 44*h*. The PI compensator 44 of the present embodiment inputs a signal produced by using the subtractor 44*g* and the gain setter 44*h* to the adder 44*d* and inputs, to the integrator 44*e*, not a signal from the gain setter 44*c* but a result of addition of the signal from the gain setter 44*c* and a signal from the gain setter 44*h*. With this configuration, it is possible to prevent reset-wind-up operation, in other words, cause the control signal 22*a* to automatically track the heating control signal 17.

In this manner, after the heating command signal 17*a* is input, the fluid temperature controller 22 outputs the control signal 22*a* so that the numerical value set to the signal generator 41 and the temperature indicated by the temperature measurement signal 16*a* match each other. Then, in a case in which the control signal 22*a* is not selected as an output signal at the signal selector 25 to be described later, the control signal 22*a* automatically tracks the heating control signal 17 that is a selected control signal. The numerical value set to the signal generator 41 is an example of a second limit value related to the temperature of the first heat transfer fluid. The temperature of the heat transfer fluid 12*a* of the present embodiment is limited to a value near the temperature corresponding to the numerical value set to the signal generator 41.

[C-3] Temperature Change Rate Controller 23

Figure 6:
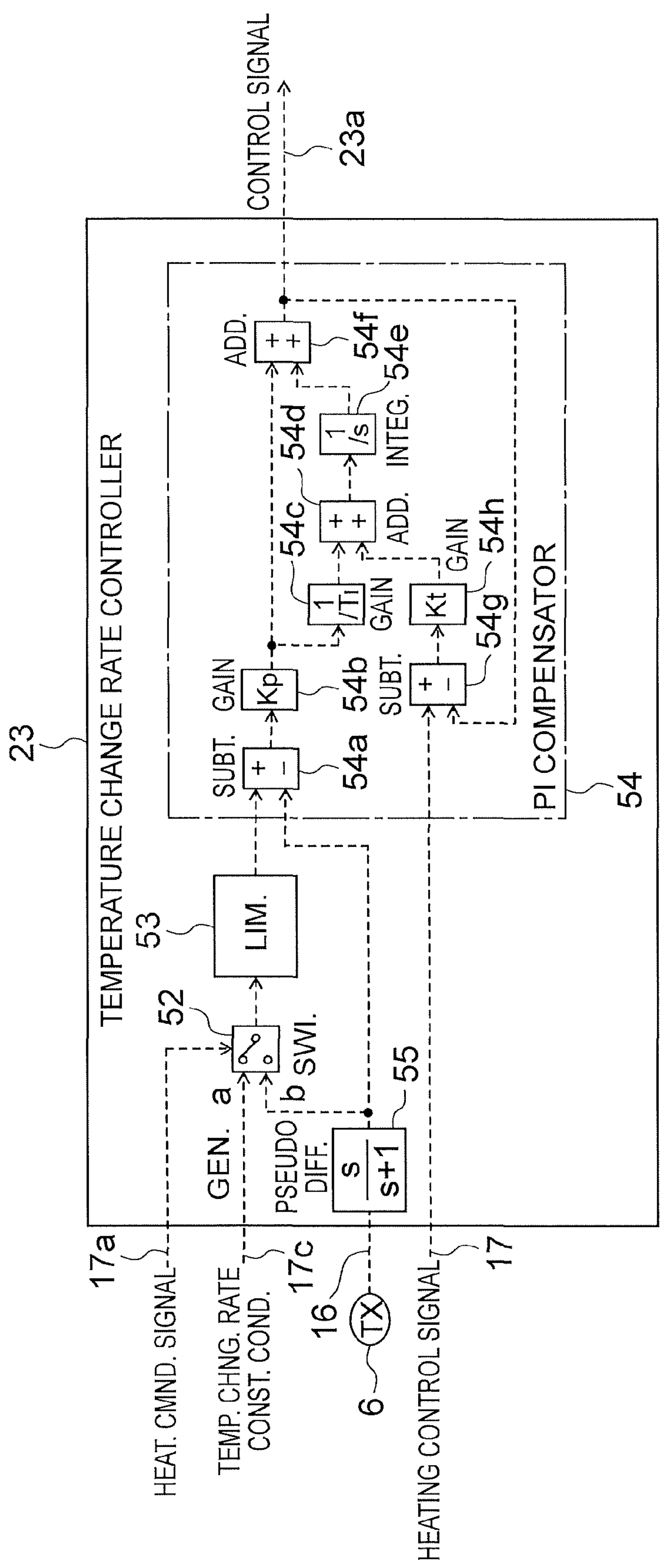
FIG. 6 is a schematic diagram illustrating the configuration of a temperature change rate controller of the first embodiment.

FIG. 6 is a schematic diagram illustrating the configuration of the temperature change rate controller 23 of the first embodiment.

The temperature change rate controller 23 receives the heating command signal 17*a*, the temperature change rate constraint condition 17*c*, the temperature measurement signal 16, and the heating control signal 17 and outputs the control signal 23*a*. The temperature change rate controller 23 includes a switcher 52, a change rate limiter 53, a PI compensator 54, and a pseudo differentiator 55.

The switcher 52 includes an input terminal "a" to which the temperature change rate constraint condition 17*c* is input, an input terminal "b" to which an output signal from the pseudo differentiator 55 is input, and a control terminal to which the heating command signal 17*a* is input. When the heating command signal 17*a* has the value of "True", the switcher 52 outputs the "a" side value. When the heating command signal 17*a* has the value of "False", the switcher 52 outputs the "b" side value.

The change rate limiter 53 converts an input signal from the switcher 52 into a signal that changes in accordance with a constant change rate set in advance, and outputs the converted signal to the PI compensator 54.

The pseudo differentiator 55 receives the temperature measurement signal 16 from the temperature meter 6, performs differential calculation of the temperature measurement signal 16, and outputs the change rate of the temperature measurement signal 16. In this manner, the pseudo differentiator 55 can receive the internal temperature of the heat storage 2 and output the change rate of the internal temperature of the heat storage 2. The pseudo differentiator 55 outputs an output signal (change rate signal) indicating the change rate of the temperature measurement signal 16 to the switcher 52 and the PI compensator 54.

The PI compensator 54 includes a subtractor 54*a*, a gain setter 54*b*, a gain setter 54*c*, an adder 54*d*, an integrator 54*e*, an adder 54*f*, a subtractor 54*g*, and a gain setter 54*h*.

The subtractor 54*a* receives the above-described converted signal (set value) from the change rate limiter 53 and receives the above-described change rate signal (process value) from the pseudo differentiator 55. The PI compensator 54 performs compensation operation by setting an appropriate numerical value to each of the gain setters 54*b*, 54*c*, and 54*h* so that the difference between the set value and the process value is zero. Specifically, the PI compensator 54 outputs the control signal 23*a* with which the difference between each set value and the process value becomes closer to zero. The subtractor 54*a*, the integrator 54*e*, and the adder 54*f* perform subtraction, integration, and addition, respectively, for PI compensation.

The subtractor 54*g* receives the control signal 23*a* and the heating control signal 17 and outputs a result of subtraction between the control signal 23*a* and the heating control signal 17 to the gain setter 54*h*. The PI compensator 44 of the present embodiment inputs a signal produced by using the subtractor 54*g* and the gain setter 54*h* to the adder 54*d* and inputs, to the integrator 54*e*, not a signal from the gain setter 54*c* but a result of addition of the signal from the gain setter 54*c* and a signal from the gain setter 54*h*. With this configuration, it is possible to prevent reset-wind-up operation, in other words, cause the control signal 23*a* to automatically track the heating control signal 17.

In this manner, after the heating command signal 17*a* is input, the temperature change rate controller 23 outputs the control signal 23*a* so that the numerical value indicated by the temperature change rate constraint condition 17*c* and the change rate calculated by the pseudo differentiator 55 match each other. Then, in a case in which the control signal 23*a* is not selected as an output signal the signal selector 25 to be described later, the control signal 23*a* automatically tracks the heating control signal 17 that is a selected control signal. The numerical value indicated by the temperature change rate constraint condition 17*c* is an example of a fourth limit value related to the change rate of the internal temperature of the heat storage. The change rate of the internal temperature of the heat storage 2 of the present embodiment is limited to a value near the change rate corresponding to the numerical value indicated by the temperature change rate constraint condition 17*c*.

[C-4] Temperature Maximum Value Controller 24

Figure 7:
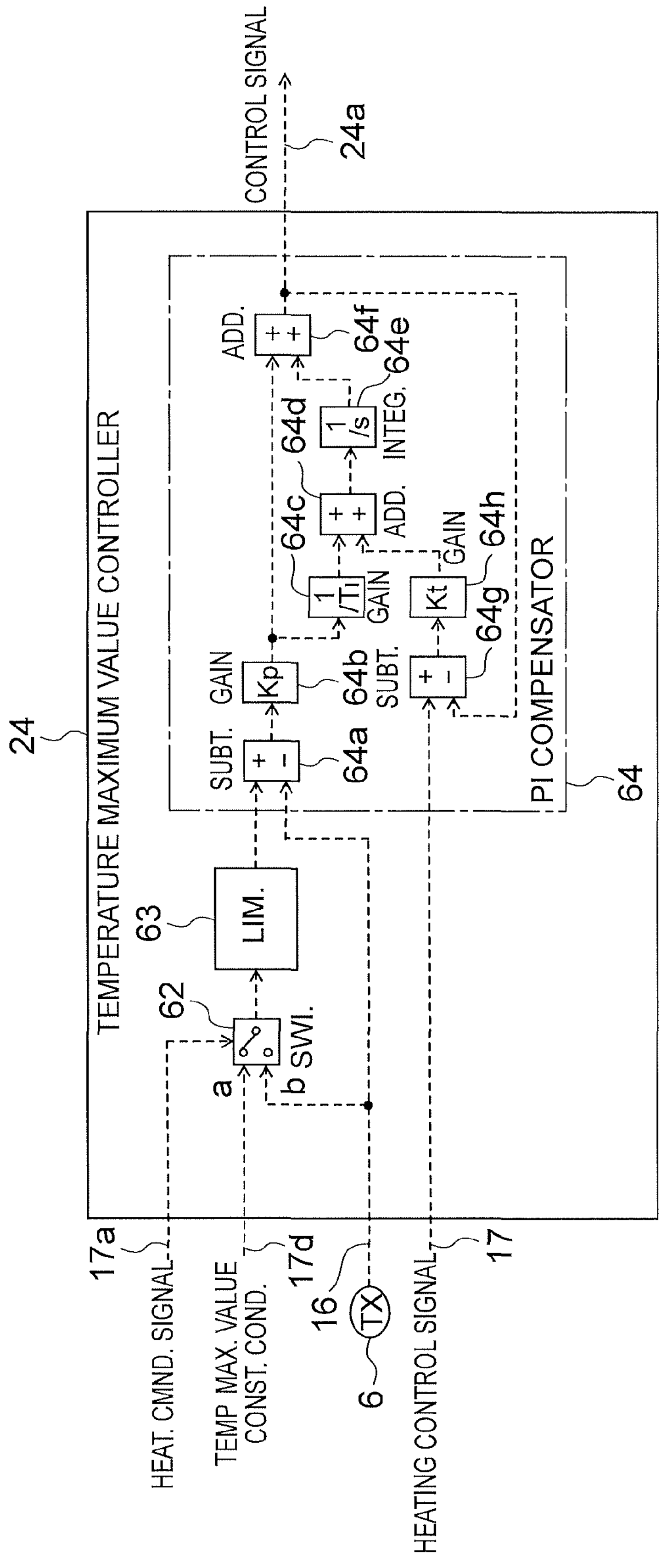
FIG. 7 is a schematic diagram illustrating the configuration of a temperature maximum value controller of the first embodiment.

FIG. 7 is a schematic diagram illustrating the configuration of the temperature maximum value controller 24 of the first embodiment.

The temperature maximum value controller 24 receives the heating command signal 17*a*, the temperature maximum value constraint condition 17*d*, the temperature measurement signal 16, and the heating control signal 17 and outputs the control signal 24*a*. The temperature maximum value controller 24 includes a switcher 62, a change rate limiter 63, and a PI compensator 64.

The switcher 62 includes an input terminal "a" to which the temperature maximum value constraint condition 17*d* is input, an input terminal "b" to which the temperature measurement signal 16 from the temperature meter 6*a* is input, and a control terminal to which the heating command signal 17*a* is input. When the heating command signal 17*a* has the value of "True", the switcher 62 outputs the "a" side value. When the heating command signal 17*a* has the value of "False", the switcher 62 outputs the "b" side value.

The change rate limiter 63 converts an input signal from the switcher 62 into a signal that changes in accordance with a constant change rate set in advance, and outputs the converted signal to the PI compensator 64.

The PI compensator 64 includes a subtractor 64*a*, a gain setter 64*b*, a gain setter 64*c*, an adder 64*d*, an integrator 64*e*, an adder 64*f*, a subtractor 64*g*, and a gain setter 64*h*.

The subtractor 64*a* receives the above-described converted signal (set value) from the change rate limiter 63 and receives the temperature measurement signal 16 (process value) from the temperature meter 6. The PI compensator 64 performs compensation operation by setting an appropriate numerical value to each of the gain setters 64*b*, 64*c*, and 64*h* so that the difference between the set value and the process value is zero. Specifically, the PI compensator 64 outputs the control signal 24*a* with which the difference between each set value and the process value becomes closer to zero. The subtractor 64*a*, the integrator 64*e*, and the adder 64*f* perform subtraction, integration, and addition, respectively, for PI compensation.

The subtractor 64*g* receives the control signal 24*a* and the heating control signal 17 and outputs a result of subtraction between the control signal 24*a* and the heating control signal 17 to the gain setter 64*h*. The PI compensator 64 of the present embodiment inputs a signal produced by using the subtractor 64*g* and the gain setter 64*h* to the adder 64*d* and inputs, to the integrator 64*e*, not a signal from the gain setter 64*c* but a result of addition of the signal from the gain setter 64*c* and a signal from the gain setter 64*h*. With this configuration, it is possible to prevent reset-wind-up operation, in other words, cause the control signal 24*a* to automatically track the heating control signal 17.

In this manner, after the heating command signal 17*a* is input, the temperature maximum value controller 24 outputs the control signal 24*a* so that the numerical value indicated by the temperature maximum value constraint condition 17*d* and the temperature indicated by the temperature measurement signal 16*a* match each other. Then, in a case in which the control signal 24*a* is not selected as an output signal the signal selector 25 to be described later, the control signal 24*a* automatically tracks the heating control signal 17 that is a selected control signal. The numerical value indicated by the temperature maximum value constraint condition 17*d* is an example of a third limit value related to the internal temperature of the heat storage. The temperature of the heat transfer fluid 12*a* of the present embodiment is limited to a value near the temperature corresponding to the numerical value set to the signal generator 41. The maximum value of the internal temperature of the heat storage 2 of the present embodiment is limited to a value near the maximum value corresponding to the numerical value indicated by the temperature maximum value constraint condition 17*d*.

[C-5] Signal Selector 25

Figure 8:
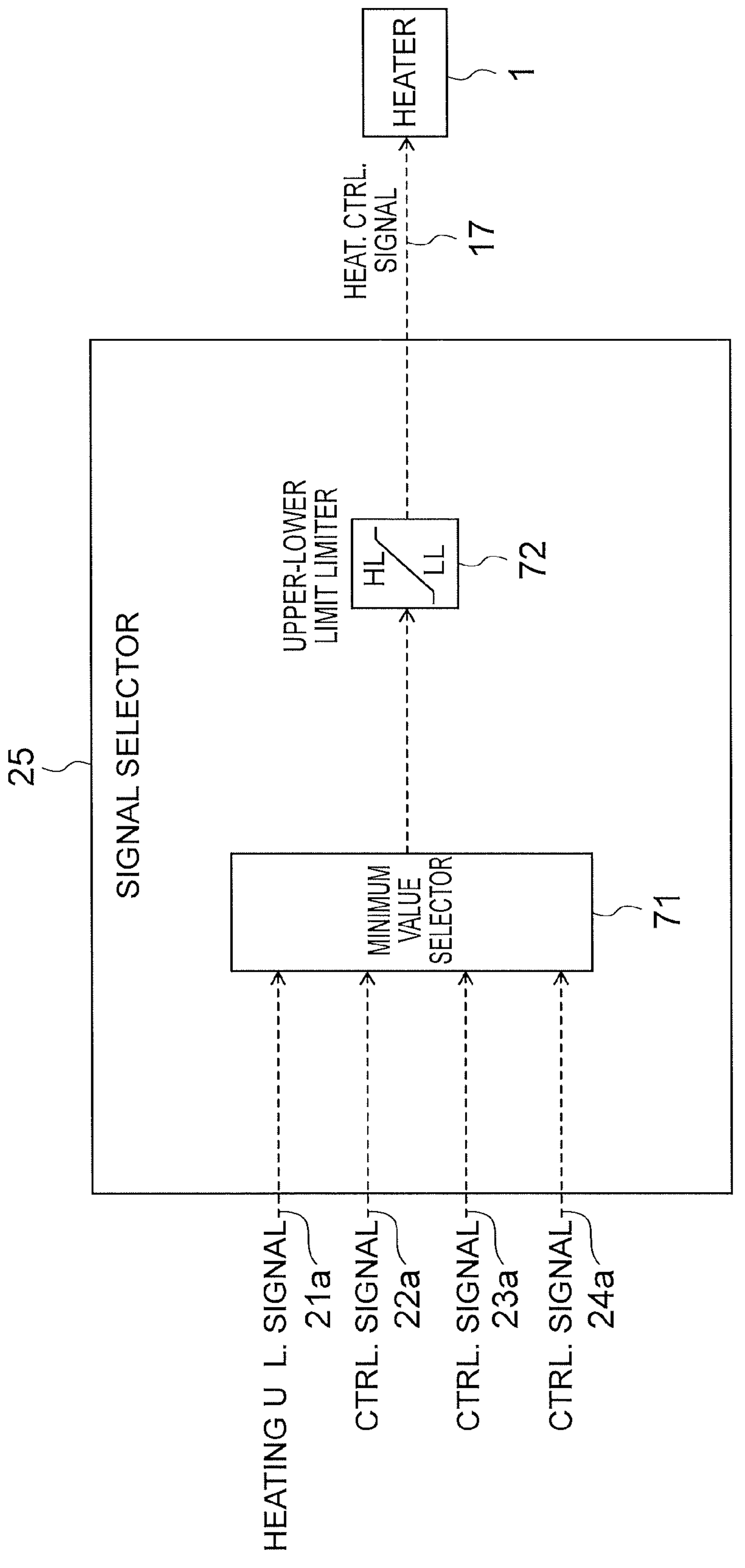
FIG. 8 is a schematic diagram illustrating the configuration of a signal selector of the first embodiment.

FIG. 8 is a schematic diagram illustrating the configuration of the signal selector 25 of the first embodiment.

The signal selector 25 receives the heating upper limit signal 21*a* and the control signals 22*a*, 23*a*, and 24*a* and outputs the heating control signal 17. The signal selector 25 includes a minimum value selector 71 and an upper-lower limit limiter 72.

The minimum value selector 71 selects the smallest value from among four values included in the four received signals (the heating upper limit signal 21*a* and the three control signals 22*a*, 23*a*, and 24*a*) and outputs the selected value to the upper-lower limit limiter 72. With this configuration, the heating control signal 17 can be output from the signal selector 25 based on the tightest limit value among the above-described first, second, third, and fourth limit values.

For example, the value of the control signal 22*a* is selected in a case in which the amount of energy consumption by the heater 1 is smallest when the second limit value among the first, second, third, and fourth limit values is selected. In this case, operation of the heater 1 is controlled to obey limitation with the second limit value. Since the second limit value is the tightest limit value, operation of the heater 1 is controlled to obey limitation with the first, third, and fourth limit values when operation of the heater 1 is controlled to obey limitation with the second limit value. The reference of value selection by the minimum value selector 71 may be other than the amount of energy consumption by the heater 1.

The upper-lower limit limiter 72 limits the value input from the minimum value selector 71 to a value in the range between an upper limit value and a lower limit value that are set in advance, and outputs the heating control signal 17 including the limited value to the heater 1. Specifically, when the value input from the minimum value selector 71 is equal to or larger than the upper limit value, the upper-lower limit limiter 72 outputs the upper limit value. When the value input from the minimum value selector 71 is equal to or smaller than the lower limit value, the upper-lower limit limiter 72 outputs the lower limit value.

In this manner, the signal selector 25 limits the smallest value among the values of the four received signals to a value between the upper limit value and the lower limit value and outputs the value. The value is output to the heater 1 by the heating control signal 17. Accordingly, operation of the heater 1 of the present embodiment is controlled based on the four signals input to the signal selector 25.

According to the present embodiment, it is possible to suitably control the amount of energy consumption by the heater 1, the temperature of the heat transfer fluid 12*a*, the change rate of the internal temperature of the heat storage 2, and the maximum value of the internal temperature of the heat storage 2 by controlling operation of the heater 1 with the heating controller 7. For example, it is possible to prevent abrupt change of the internal temperature and excessive rise of the internal temperature by controlling the change rate and maximum value of the internal temperature of the heat storage 2. Abrupt change of the internal temperature and excessive rise of the internal temperature may cause damage (for example, crushing of crushed rocks) on the heat storage material in the heat storage 2. According to the present embodiment, it is possible to prevent damage on the heat storage material by controlling the internal temperature. Moreover, for example, it is possible to lower the internal temperature of the heat storage 2, reduce the amount of energy consumption by the heater 1, and prevent degradation of the heat transfer fluid 12*a* by controlling the temperature of the heat transfer fluid 12*a*.

The heating controller 7 of the present embodiment selects the smallest value from among the four values included in the four signals (the heating upper limit signal 21*a* and the three control signals 22*a*, 23*a*, and 24*a*) with an override configuration. In other words, the four signals are all input to the signal selector 25, and the signal selector 25 selects the smallest value from among the four values all at once. However, the heating controller 7 may generate, for example, four signals including four values of first, second, third, and fourth values, select the smallest value (referred to as a fifth value) from among the third and fourth values, select the smallest value (referred to as a sixth value) from among the first, second, and fifth values, and output the sixth value. In this manner, the heating controller 7 may select a smallest value through a plurality of times of selection. Such a configuration is referred to as a cascade configuration. Such an example of the heating controller 7 will be described in a second embodiment.

The heating controller 7 of the present embodiment may control operation of the heater 1 based on four signals related to the amount of energy consumption by the heater 1, the temperature of the heat transfer fluid 12*a*, the change rate of the internal temperature of the heat storage 2, and the maximum value of the internal temperature of the heat storage 2, or may control operation of the heater 1 based on two or more of the four signals. For example, the minimum value selector 71 may receive two signals related to the change rate and maximum value of the internal temperature of the heat storage 2, select the smallest value from among two values included in the two signals, and output the selected value to the upper-lower limit limiter 72. The heating controller 7 of the present embodiment may control operation of the heater 1 based on the above-described four signals and one or more other signals.

Before selecting the smallest value from among four values included in four signals, the minimum value selector 71 of the present embodiment may convert the four values into values that can be compared to one another. For example, in a case in which the first value represents temperature and the second value represents the change rate of temperature, the second value may be converted into a value corresponding to temperature. Accordingly, the first and second values can be compared to each other.

[D] Configuration and Function of Air-Sending Controller 9

Figure 9:
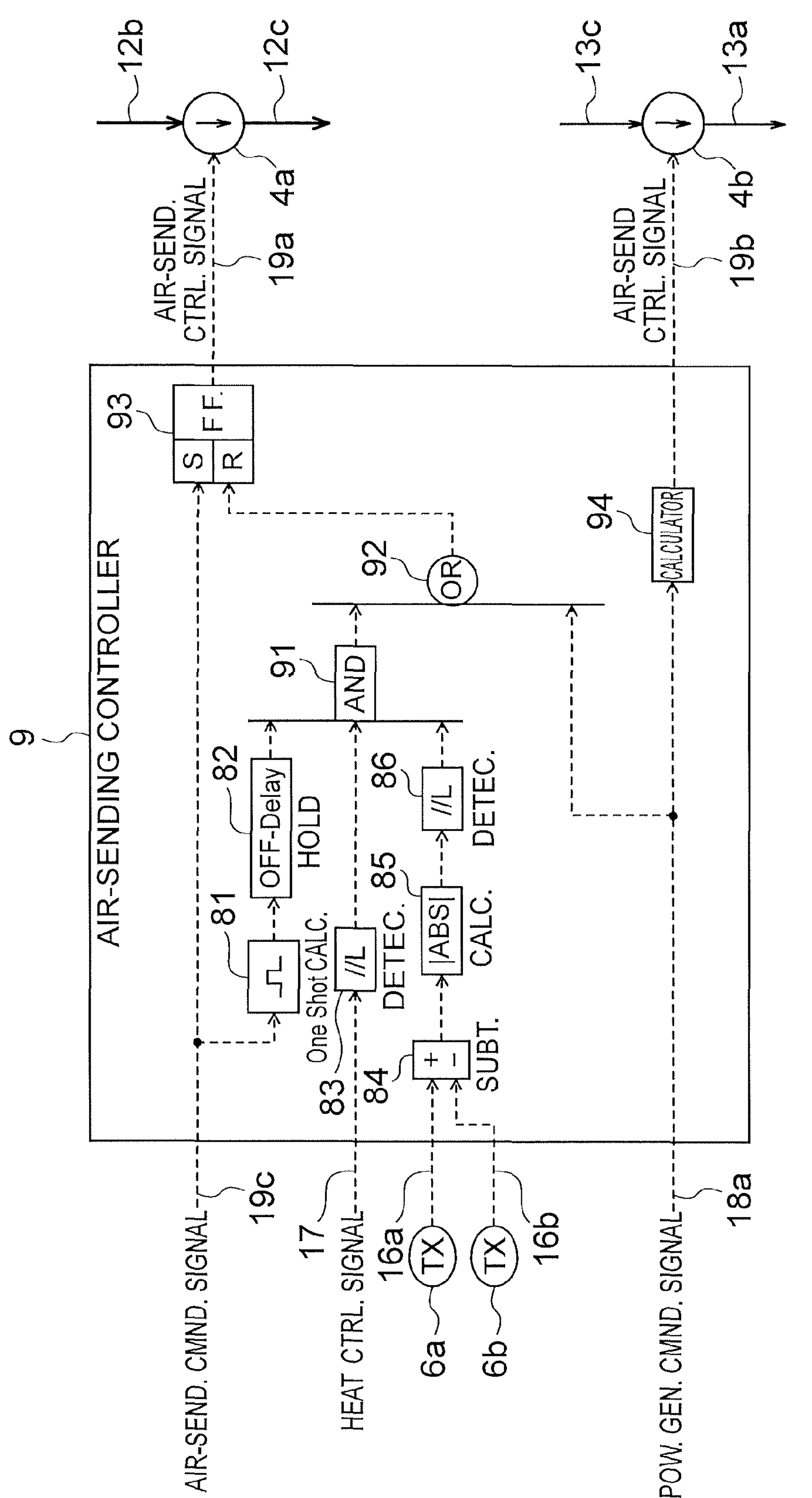
FIG. 9 is a schematic diagram illustrating the configuration of an air-sending controller of the first embodiment.

FIG. 9 is a schematic diagram illustrating the configuration of the air-sending controller 9 of the first embodiment.

The air-sending controller 9 receives the air-sending command signal 19*c*, the heating control signal 17, the temperature measurement signals 16*a* and 16*b*, and the power generation command signal 18*a* and outputs the first and second air-sending control signals 19*a* and 19*b*. The air-sending controller 9 includes an one-shot calculator 81, a signal holder 82, a low value detector 83, a subtractor 84, an absolute value calculator 85, a low value detector 86, an AND calculator 91, an OR calculator 92, and an SR flip-flop calculator 93. The air-sending controller 9 further includes a calculator 94 (details of which are omitted) for the second air-sending control signal 19*b*.

The one-shot calculator 81 receives the air-sending command signal 19*c* and outputs the air-sending command signal 19*c* as a "True" signal of one pulse. When the received signal from the one-shot calculator 81 is "True", the signal holder 82 delays and outputs the received signal by a time period set in advance. For example, when the signal received by the signal holder 82 becomes "True" and then becomes "False", the signal holder 82 delays output of "True" by a set time period from a time at which the signal becomes "False", and then changes the output to "False". The output signal from the signal holder 82 is input to the AND calculator 91.

The low value detector 83 compares the value of the heating control signal 17 to a value set in advance, and outputs a "True" signal when the value of the heating control signal 17 is smaller than the value set in advance. The output signal from the low value detector 83 is input to the AND calculator 91.

The subtractor 84 outputs the difference between the temperature measurement signal 16*a* and the temperature measurement signal 16*b*. The absolute value calculator 85 outputs the absolute value of the difference output from the subtractor 84. The low value detector 86 compares the absolute value output from the absolute value calculator 85 to a value set in advance, and outputs a "True" signal when the absolute value is smaller than the value set in advance. The output signal from the low value detector 86 is input to the AND calculator 91.

When the output signals from the signal holder 82, the low value detector 83, and the low value detector 86 are all "True", the AND calculator 91 outputs "True". Otherwise, the AND calculator 91 outputs "False".

When at least one of the output signal from the AND calculator 91 and the power generation command signal 18*a* is "True", the OR calculator 92 outputs "True". Otherwise, the OR calculator 92 outputs "False".

The SR flip-flop calculator 93 includes an R input terminal to which the output signal from the OR calculator 92 is input, and an S input terminal to which the air-sending command signal 19*c* is input, and the SR flip-flop calculator 93 operates as follows. When the value of the R input terminal is "False" and the value of the S input terminal is "True", the SR flip-flop calculator 93 outputs "True". When the value of the R input terminal is "False" and the value of the S input terminal is temporarily "True" and then "False", the SR flip-flop calculator 93 continuously outputs "True" while the value of the R input terminal is "False". When the value of the R input terminal is "True", the SR flip-flop calculator 93 outputs "False" irrespective of whether the value of the S input terminal is "True" or "False". The output signal from the SR flip-flop calculator 93 is the first air-sending control signal 19*a*.

The calculator 94 for the second air-sending control signal 19*b* receives the power generation command signal 18*a* and outputs the second air-sending control signal 19*b*. The SR flip-flop calculator 93 indirectly controls, based on the heating control signal 17, the first air sender 4*a* that circulates the heat transfer fluid 12*b* for the heater 1, whereas the calculator 94 controls, based on the power generation command signal 18*a*, the second air sender 4*b* that circulates the heat transfer fluid 13*c* for the power generator 3.

In this manner, the air-sending controller 9 can perform air-sending control in cooperation with heating control of the heating controller 7.

[E] Operation of Heat Storage Power Generation System of First Embodiment

FIGS. 10A to 10D are diagrams for description of operation of the heat storage power generation system of the first embodiment, illustrating situations of heating and air-sending operation control in the first embodiment. In FIGS. 10A to 10D, the horizontal axis represents the same time. In FIGS. 10A to 10D, the vertical axis represents change of energy, temperature, and flow rate at the time.

Figures 10A, 10B, 10C, 10D:
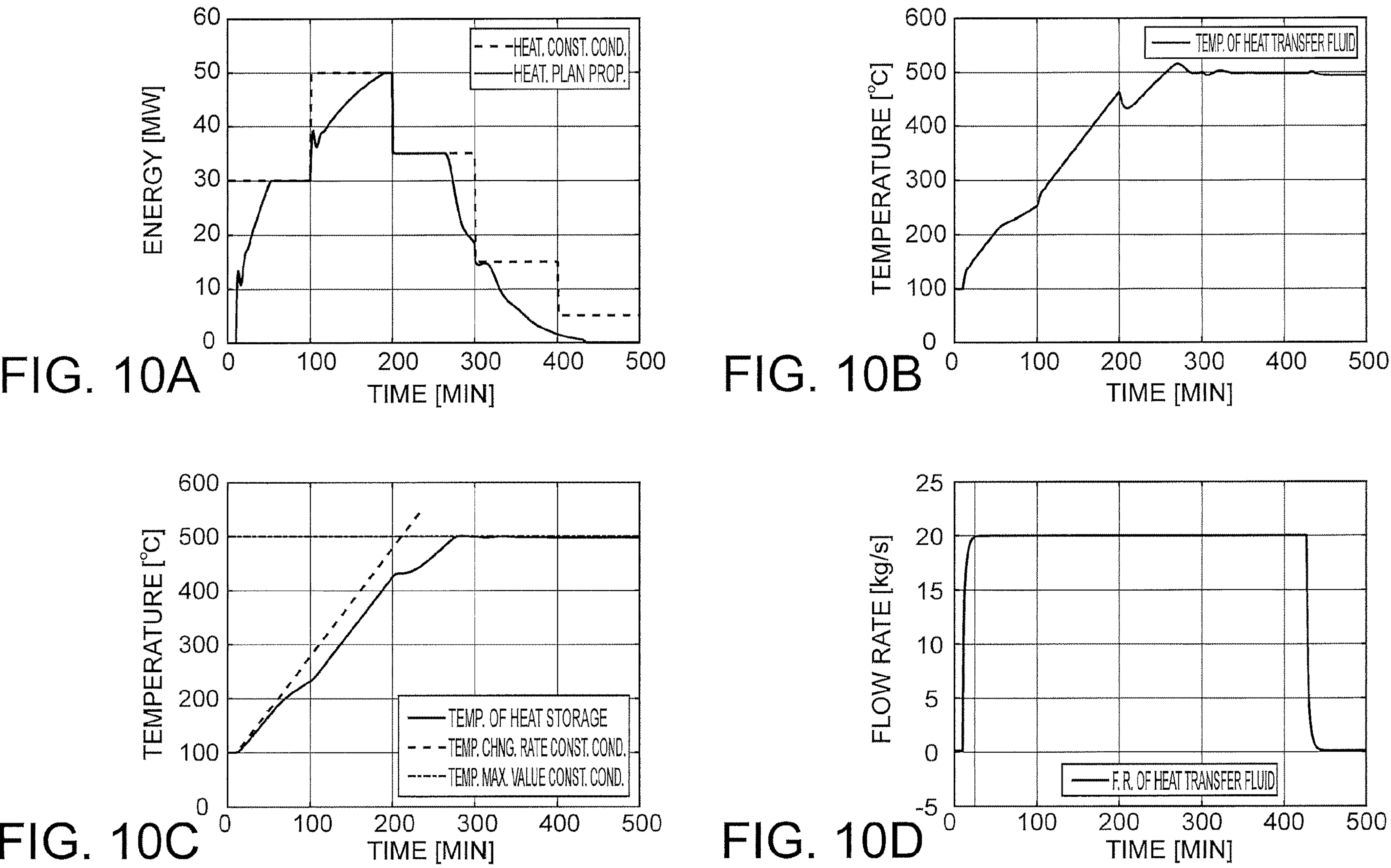
FIGS. 10A to 10D are diagrams for description of operation of the heat storage power generation system of the first embodiment.

FIG. 10A illustrates temporal change of the amount of energy consumption by the heater 1. Specifically, the dotted line illustrates the heating upper limit signal 21*a*, and the solid line illustrates the amount of energy consumption by the heater 1. According to FIG. 10A, the heater 1 of the present embodiment is operated at the amount of energy consumption equal to or smaller than the limit value set in the heating constraint condition 17*b*.

FIG. 10B illustrates temporal change of the temperature measurement signal 16*a* that holds the temperature of the heat transfer fluid 12*a*. FIG. 10B illustrates a situation in which the temperature of the heat transfer fluid 12*a* rises under control performed by the heating controller 7.

FIG. 10C illustrates temporal change of the temperature measurement signal 16 that holds the internal temperature of the heat storage 2. FIG. 10C illustrates a situation in which the internal temperature of the heat storage 2 changes while satisfying both the temperature change rate constraint condition 17*c* and the temperature maximum value constraint condition 17*d* under control performed by the heating controller 7.

FIG. 10D illustrates temporal change of the flow rate of the heat transfer fluid 12*a*. FIG. 10D illustrates a situation in which control by the first air sender 4*a* that causes the heat transfer fluid 12*a* to flow is performed for a time period necessary for heating of the heat transfer fluid 12*c*.

As described above, the heat storage power generation system of the present embodiment controls heating of the heat transfer fluid 12*c* by the heater 1 based on the first limit value related to the amount of energy consumption by the heater 1, the second limit value related to the temperature of the heat transfer fluid 12*a*, the third limit value related to the maximum value of the internal temperature of the heat storage 2, and the fourth limit value related to the change rate of the internal temperature of the heat storage 2. In this manner, according to the present embodiment, it is possible to perform heat storage power generation by suitably using the heat storage material in the heat storage 2. For example, it is possible to prevent damage (for example, crushing of crushed rocks) on the heat storage material and heat the entire heat storage material while appropriately controlling the maximum value and change rate of the temperature of the heat storage material.

Second Embodiment

[A] Configuration and Function of Heating Controller 7

Figure 11:
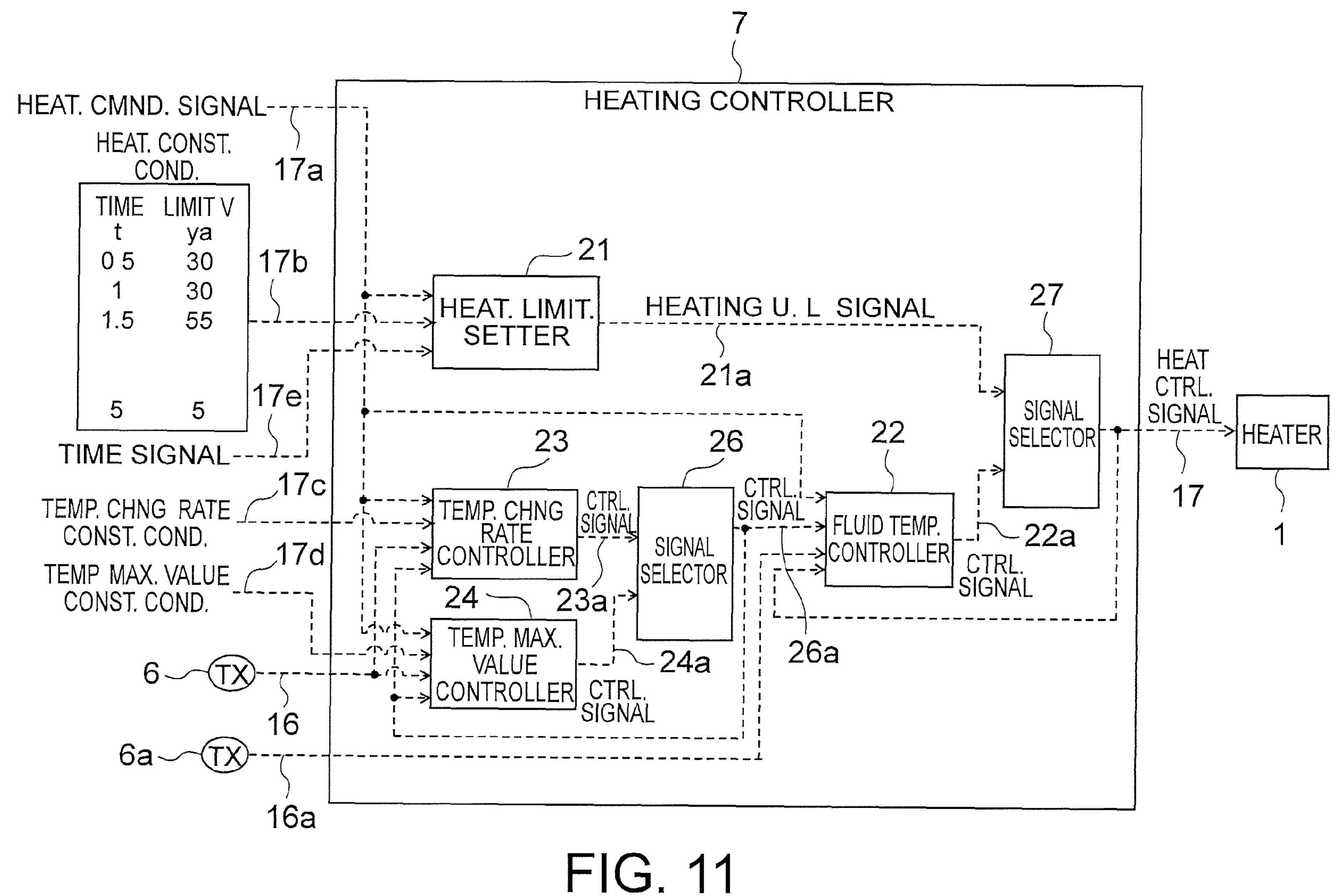
FIG. 11 is a schematic diagram illustrating the configuration of a heating controller of a second embodiment.

FIG. 11 is a schematic diagram illustrating the configuration of the heating controller 7 of the second embodiment.

Similarly to the heat storage power generation system of the first embodiment, the heat storage power generation system of the present embodiment has the configuration illustrated in FIG. 1. Moreover, the temperature meters 6, 6*a*, and 6*b* of the present embodiment are disposed as illustrated in FIG. 2, and the air-sending controller 9 of the present embodiment has the configuration illustrated in FIG. 9. However, the heating controller 7 of the present embodiment has the configuration illustrated in FIG. 11.

The heating controller 7 of the present embodiment receives the temperature measurement signals 16 and 16*a*, the heating command signal 17*a*, the heating constraint condition 17*b*, the temperature change rate constraint condition 17*c*, the temperature maximum value constraint condition 17*d*, and the time signal 17*e* and outputs the heating control signal 17. The heating controller 7 of the present embodiment includes the heating limitation setter 21, the fluid temperature controller 22, the temperature change rate controller 23, the temperature maximum value controller 24, and signal selectors 26 and 27. FIG. 11 additionally illustrates the heating upper limit signal 21*a* output from the heating limitation setter 21, the control signal 22*a* output from the fluid temperature controller 22, the control signal 23*a* output from the temperature change rate controller 23, the control signal 24*a* output from the temperature maximum value controller 24, and a control signal 26*a* output from the signal selector 26.

Constituent components included in the present embodiment will be described below. The configurations of the heating limitation setter 21, the fluid temperature controller 22, the temperature change rate controller 23, and the temperature maximum value controller 24 of the present embodiment have the components illustrated in FIGS. 4, 5, 6, and 7 respectively, as in the first embodiment.

[A-1] Signal Selector 26

Figure 12:
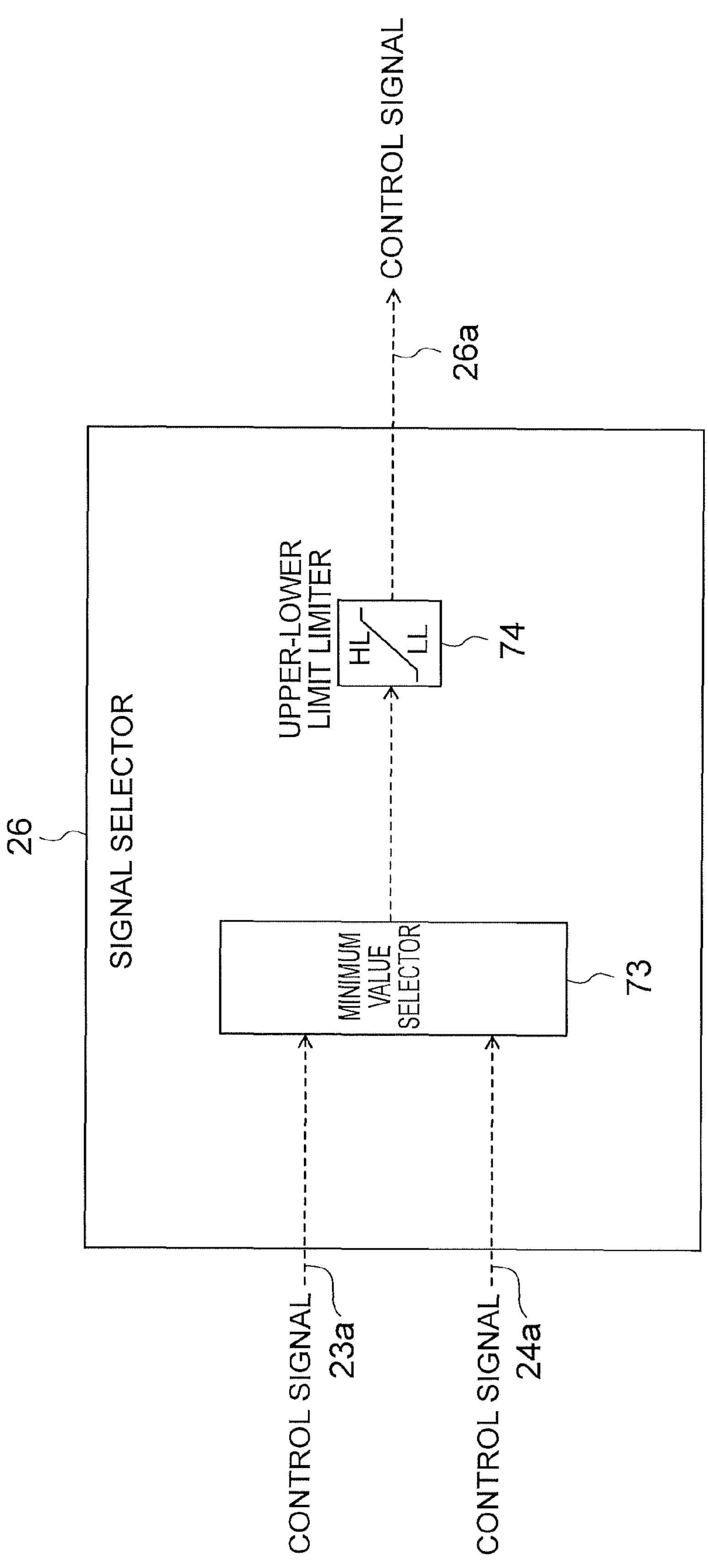
FIG. 12 is a schematic diagram illustrating the configuration of a signal selector of the second embodiment.

FIG. 12 is a schematic diagram illustrating the configuration of the signal selector 26 of the second embodiment.

The signal selector 26 receives the control signals 23*a* and 24*a* and outputs the control signal 26*a*. The signal selector 26 includes a minimum value selector 73 and an upper-lower limit limiter 74.

The minimum value selector 73 selects the smallest value from among the two values included in the received two signals (control signals 23*a* and 24*a*) and outputs the selected values to the upper-lower limit limiter 74. In this manner, the control signal 26*a* can be output from the signal selector 26 based on the tightest limit value among the above-described third and fourth limit values. The function of the minimum value selector 73 is substantially the same as the function of the minimum value selector 71.

The upper-lower limit limiter 74 limits the value input from the minimum value selector 73 into a value in the range between an upper limit value and a lower limit value that are set in advance and outputs the control signal 26*a* including the limited value to the fluid temperature controller 22. Specifically, when the value input from the minimum value selector 73 is equal to or larger than the upper limit value, the upper-lower limit limiter 74 outputs the upper limit value. When the value input from the minimum value selector 73 is equal to or smaller than the lower limit value, the upper-lower limit limiter 74 outputs the lower limit value. The function of the upper-lower limit limiter 74 is substantially the same as the function of the upper-lower limit limiter 72.

In this manner, the signal selector 26 limits the smallest value among the values of the two received signals to a value between the upper limit value and the lower limit value and outputs the value. The value is output to the fluid temperature controller 22 with the control signal 26*a*.

Similarly to the fluid temperature controller 22 of the first embodiment, the fluid temperature controller 22 of the present embodiment generates the control signal 22*a* and then outputs, as the definitive control signal 22*a* to the signal selector 27, the smallest value among the value of the generated control signal 22*a* and the value of the received control signal 26*a*. In this manner, the control signal 22*a* can be output to the signal selector 27 based on the tightest limit value among the above-described second, third, and fourth limit values.

[A-2] Signal Selector 27

Figure 13:
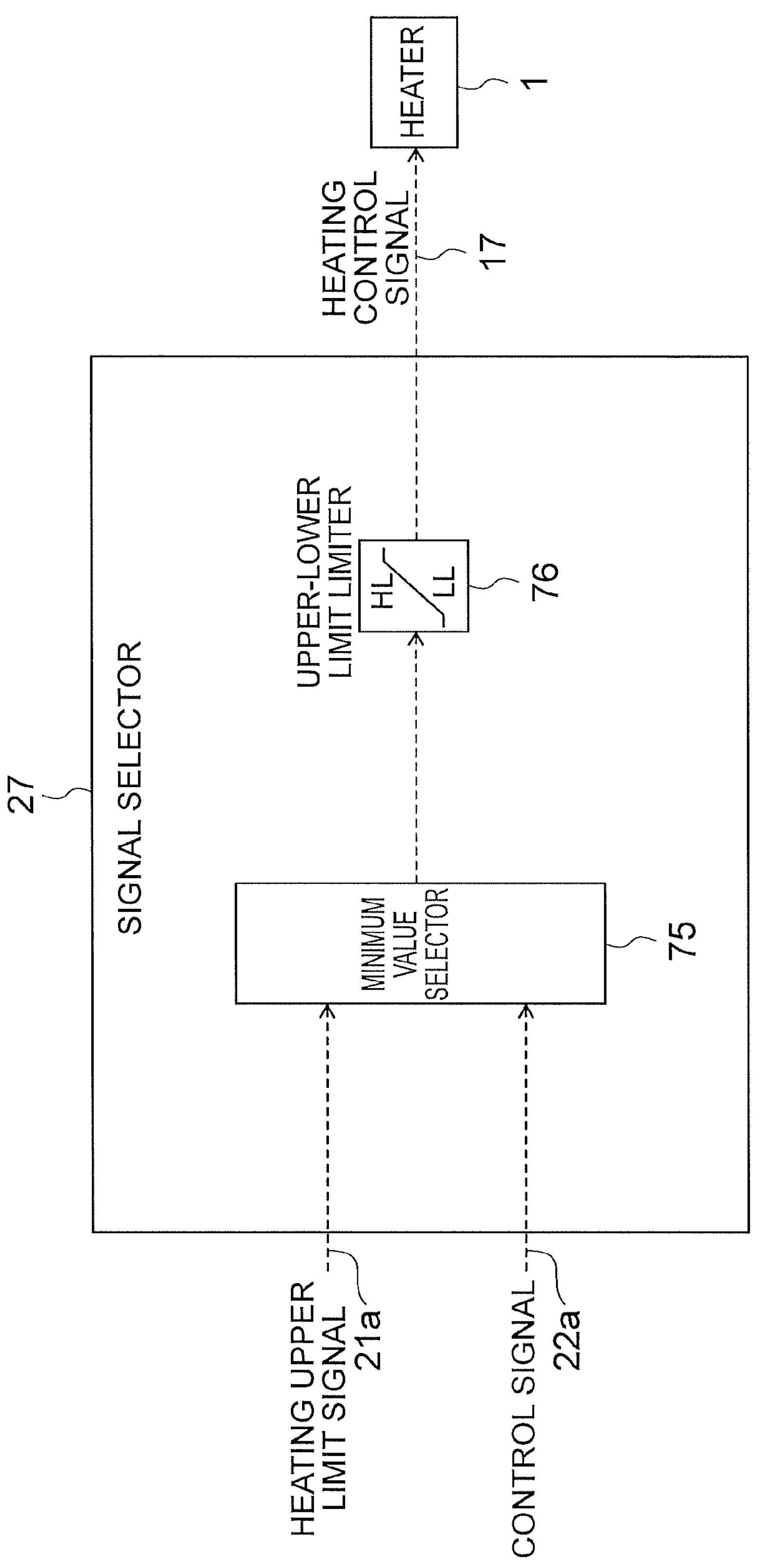
FIG. 13 is a schematic diagram illustrating the configuration of the signal selector of the second embodiment.

FIG. 13 is a schematic diagram illustrating the configuration of the signal selector 27 of the second embodiment.

The signal selector 27 receives the heating upper limit signal 21*a* and the control signal 22*a* and outputs the heating control signal 17. The signal selector 27 includes a minimum value selector 75 and an upper-lower limit limiter 76.

The minimum value selector 75 selects the smallest value from among the two values included in the received two signals (heating upper limit signal 21*a* and control signal 22*a*) and outputs the selected value to the upper-lower limit limiter 76. In this manner, the heating control signal 17 can be output from the signal selector 27 based on the tightest limit value among the above-described first, second, third, and fourth limit values. The function of the minimum value selector 75 is substantially the same as the functions of the minimum value selectors 71 and 73.

The upper-lower limit limiter 76 limits the value input from the minimum value selector 75 to a value in the range between an upper limit value and a lower limit value that are set in advance and outputs the heating control signal 17 including the limited value to the heater 1. Specifically, when the value input from the minimum value selector 75 is equal to or larger than the upper limit value, the upper-lower limit limiter 76 outputs the upper limit value. When the value input from the minimum value selector 75 is equal to or smaller than the lower limit value, the upper-lower limit limiter 76 outputs the lower limit value. The function of the upper-lower limit limiter 76 is substantially the same as the functions of the upper-lower limit limiters 72 and 74.

In this manner, the signal selector 27 limits the smallest value among the values of the received two signals to a value between the upper limit value and the lower limit value and outputs the value. The value is output to the heater 1 by the heating control signal 17. Accordingly, operation of the heater 1 of the present embodiment is controlled based on the four signals of the heating upper limit signal 21*a* and the control signals 22*a*, 23*a*, and 24*a*.

The heating controller 7 of the present embodiment selects the smallest value from among the four values included in the four signals with the cascade configuration. Specifically, the heating controller 7 of the present embodiment selects the smallest value through a plurality of times of selection. The cascade configuration of the present embodiment is complicated as compared to the override configuration of the first embodiment. However, in the present embodiment, an output value from the cascade higher-level control system is used as a set value of the cascade lower-level control system, and thus the cascade configuration of the present embodiment is easily understandable by a user as compared to the override configuration of the first embodiment because cause investigation can be easily performed when control disorder occurs as a whole. For this reason, the heating controller 7 of the present embodiment may provide a user interface with which the user can manually change the values of the heating upper limit signal 21*a*, the control signals 22*a*, 23*a*, and 24*a*, and the like. For example, in a case in which the heating controller 7 is a computer, a screen for changing these values may be displayed on a display of the heating controller 7.

[B] Operation of Heat Storage Power Generation System of Second Embodiment

FIGS. 14A to 14D are diagrams for description of operation of the heat storage power generation system of the second embodiment, illustrating a situation of heating and air-sending operation control in the second embodiment. In FIGS. 14A to 14D, the horizontal axis represents the same time. In FIGS. 14A to 14D, the vertical axis represents change of energy, temperature, and flow rate at the time.

Figures 14A, 14B, 14C, 14D:
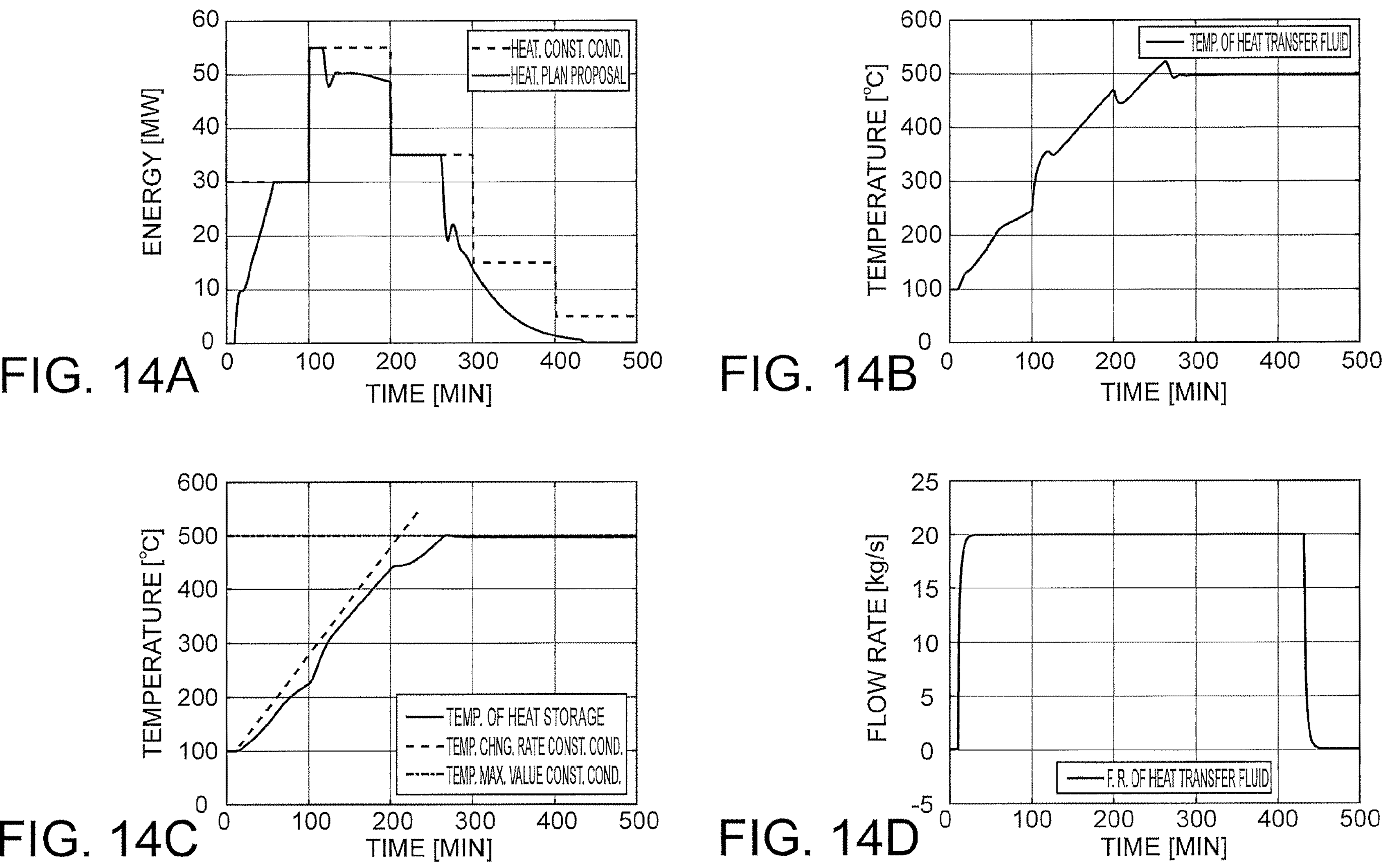
FIGS. 14A to 14D are diagrams for description of operation of a heat storage power generation system of the second embodiment.

FIG. 14A illustrates temporal change of the amount of energy consumption by the heater 1. Specifically, the dotted line illustrates the heating upper limit signal 21*a*, and the solid line illustrates the amount of energy consumption by the heater 1. According to FIG. 14A, the heater 1 of the present embodiment is operated at the amount of energy consumption equal to or smaller than the limit value set in the heating constraint condition 17*b*.

FIG. 14B illustrates temporal change of the temperature measurement signal 16*a* that holds the temperature of the heat transfer fluid 12*a*. FIG. 14B illustrates a situation in which the temperature of the heat transfer fluid 12*a* rises under control performed by the heating controller 7.

FIG. 14C illustrates temporal change of the temperature measurement signal 16 that holds the internal temperature of the heat storage 2. FIG. 14C illustrates a situation in which the internal temperature of the heat storage 2 changes while satisfying both the temperature change rate constraint condition 17*c* and the temperature maximum value constraint condition 17*d* under control performed by the heating controller 7.

FIG. 14D illustrates temporal change of the flow rate of the heat transfer fluid 12*a*. FIG. 14D illustrates a situation in which control by the first air sender 4*a* that causes the heat transfer fluid 12*a* to flow is performed for a time period necessary for heating of the heat transfer fluid 12*c*.

According to the present embodiment, similarly to the first embodiment, it is possible to perform heat storage power generation by suitably using the heat storage material in the heat storage 2.

Third Embodiment

[A] Overall Configuration

Figure 15:
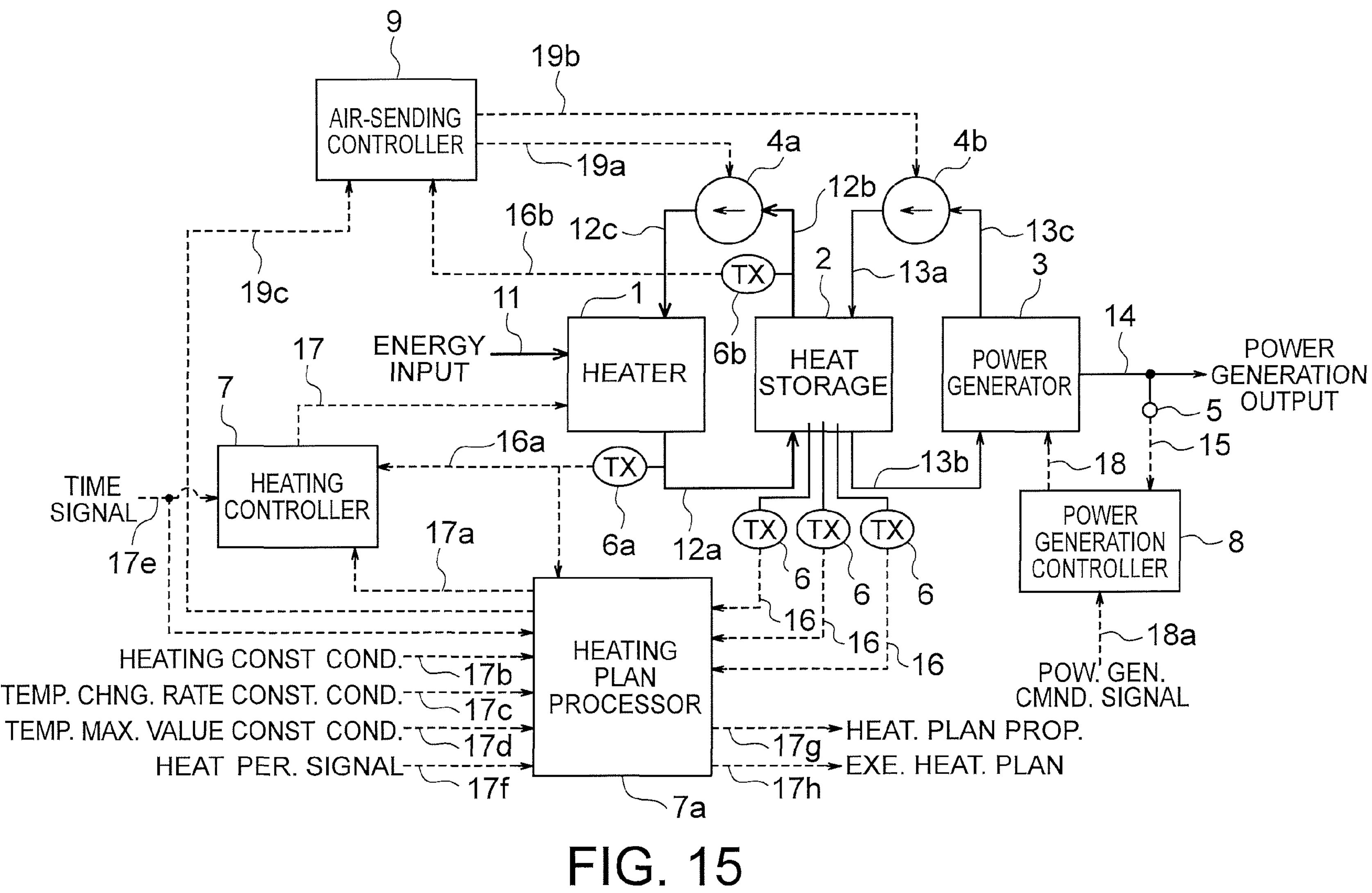
FIG. 15 is a schematic diagram illustrating the configuration of a heat storage power generation system of a third embodiment.

FIG. 15 is a schematic diagram illustrating the configuration of a heat storage power generation system of a third embodiment.

The heat storage power generation system of the present embodiment includes a heating plan processor 7*a* in addition to the constituent components of the heat storage power generation system of the first embodiment (FIG. 1). Although the heat storage power generation system of the first embodiment includes one temperature meter 6, the heat storage power generation system of the present embodiment includes a plurality of temperature meters 6. Similarly to the temperature meter 6 of the first embodiment, each temperature meter 6 of the present embodiment measures the internal temperature of the heat storage 2 and outputs the temperature measurement signal 16 indicating a result of the measurement of the internal temperature.

The heating plan processor 7*a* receives the plurality of temperature measurement signals 16, the temperature measurement signal 16*a*, the heating constraint condition 17*b*, the temperature change rate constraint condition 17*c*, the temperature maximum value constraint condition 17*d*, the time signal 17*e*, and a heating permission signal 17*f* and outputs the heating command signal 17*a*, a heating plan proposal 17*g*, an execution heating plan 17*h*, and the air-sending command signal 19*c*. Further details of the heating plan processor 7*a* of the present embodiment will be described later in Section [C].

[B] Installation Places of Temperature Meters 6, 6*a*, and 6*b*

Figure 16:
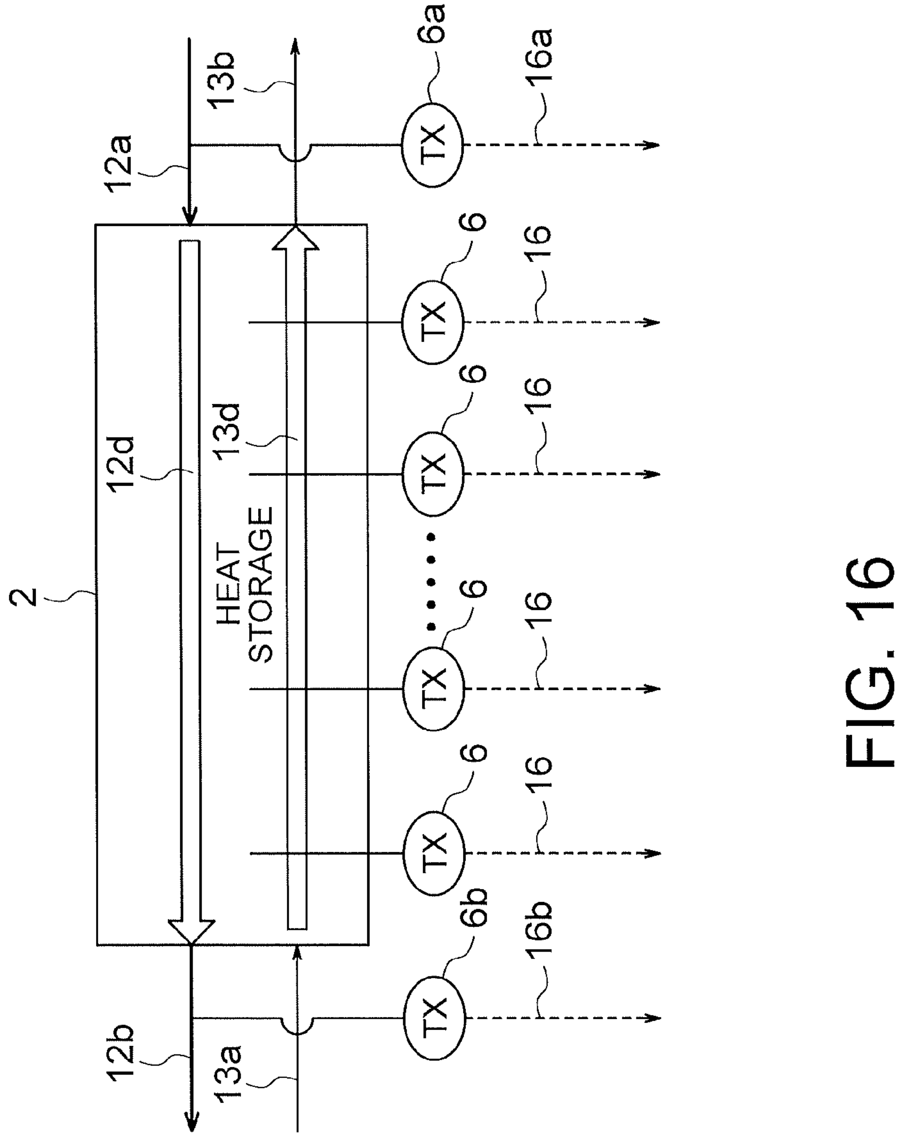
FIG. 16 is a schematic diagram illustrating disposition of a temperature meter of the third embodiment.

FIG. 16 is a schematic diagram illustrating disposition of the temperature meters 6, 6*a*, and 6*b* of the third embodiment.

FIG. 16 illustrates the plurality of temperature meters 6, one temperature meter 6*a*, and one temperature meter 6*b*. Each temperature meter 6 measures the internal temperature of the heat storage 2 and outputs the temperature measurement signal 16 indicating a result of the measurement of the internal temperature to the heating plan processor 7*a*. The temperature meter 6*a* measures the temperature of the heat transfer fluid 12*a* upstream of the entrance of the heat storage 2 and outputs the temperature measurement signal 16*a* indicating a result of the measurement of the temperature of the heat transfer fluid 12*a* to the heating controller 7 and the heating plan processor 7*a*. The temperature meter 6*b* measures the temperature of the heat transfer fluid 12*b* downstream of the exit of the heat storage 2 and outputs the temperature measurement signal 16*b* indicating a result of the measurement of the temperature of the heat transfer fluid 12*b* to the air-sending controller 9.

FIG. 16 illustrates installation places of the temperature meters 6, 6*a*, and 6*b*. In a case in which the heat storage 2 illustrated in FIG. 16 is in the heat storing mode, the heat transfer fluid 12*a* at high temperature enters the heat storage 2 from the right side, is cooled by the heat storage 2 to become the heat transfer fluid 12*b* at low temperature, and is output to the left side of the heat storage 2. In FIG. 16, heat transfer fluid flowing inside the heat storage 2 in the heat storing mode is denoted by reference sign 12*d*. In a case in which the heat storage 2 illustrated in FIG. 16 is in the heat releasing mode, the heat transfer fluid 13*a* at low temperature enters the heat storage 2 from the left side, is heated by the heat storage 2 to become the heat transfer fluid 13*b* at high temperature, and is output to the right side of the heat storage 2. In FIG. 16, heat transfer fluid flowing inside the heat storage 2 in the heat releasing mode is denoted by reference sign 13*d*.

Each temperature meter 6 of the present embodiment is used to measure the internal temperature of the heat storage 2 in the heat storing mode. The internal temperature at a place in the heat storage 2 and the internal temperature at another place in the heat storage 2 typically have different values even at the same time. In other words, distribution of the internal temperature in the heat storage 2 is typically non-uniform. The temperature at places in the heat storage 2 changes from moment to moment by as time elapses.

In this manner, in the heat storage power generation system of the present embodiment, the internal temperature of the heat storage 2 is measured by the plurality of temperature meters 6. With the increased number of temperature meters 6, it is possible to highly accurately measure distribution of the internal temperature in the heat storage 2. For this reason, the heat storage power generation system of the present embodiment desirably includes a large number such as 10 to 100 of temperature meters 6.

In FIG. 16, the plurality of temperature meters 6 are disposed alongside in the flowing directions of the heat transfer fluid 12*d* and the heat transfer fluid 13*d*, in other words, disposed alongside each other in the right-left direction. In a case in which an x direction is defined to be the direction from the left side to the right side in FIG. 16, only one temperature meter 6 is disposed at one x coordinate.

However, the temperature meters 6 may be disposed in a manner different from the disposition illustrated in FIG. 16. For example, two or more temperature meters 6 may be disposed at shifted installation places at one x coordinate. With this configuration, it is possible to measure not only one-dimensional internal temperature distribution in the x direction but also two-dimensional or three-dimensional internal temperature distribution. For example, in a case in which a y direction and a z direction are defined to be two directions orthogonal to the x direction, it is possible to measure three-dimensional internal temperature distribution by disposing the above-described plurality of temperature meters 6 in a three-dimensional array in the x, y, and z directions. The x, y, and z directions are, for example, the lateral direction, the longitudinal direction, and the depth direction in the heat storage 2.

[C] Details of Heating Plan Processor 7*a*

[C-1] Functional Configuration of Heating Plan Processor 7*a*

Figure 17:
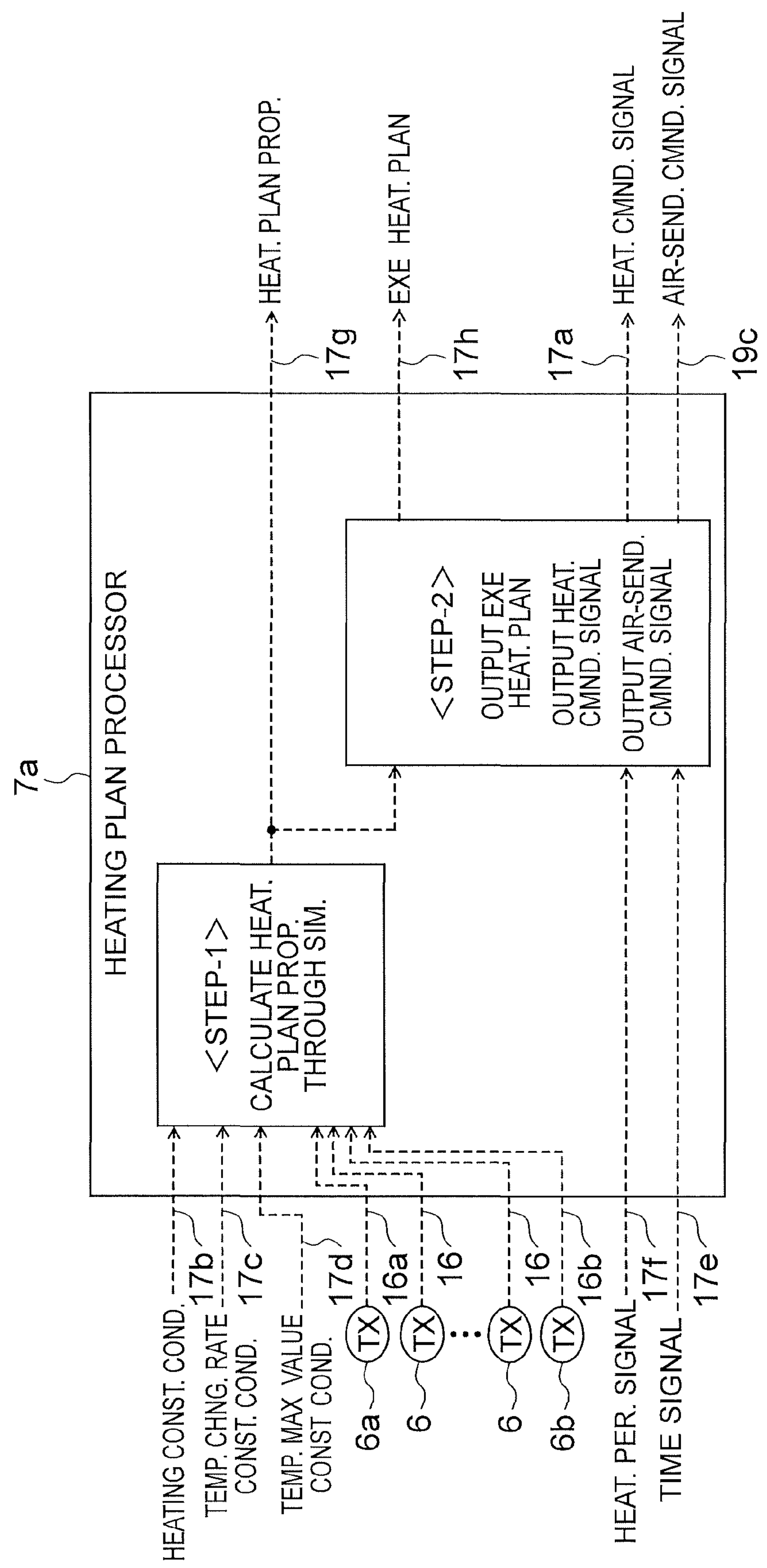
FIG. 17 is a schematic diagram illustrating a functional configuration of a heating plan processor of the third embodiment.

FIG. 17 is a schematic diagram illustrating a functional configuration of the heating plan processor 7*a* of the third embodiment.

As described above, the heating plan processor 7*a* receives the heating constraint condition 17*b*, the temperature change rate constraint condition 17*c*, the temperature maximum value constraint condition 17*d*, the time signal 17*e*, the heating permission signal 17*f*, and the temperature measurement signals 16, 16*a*, and 16*b*. Then, the heating plan processor 7*a* outputs the heating plan proposal 17*g*, the execution heating plan 17*h*, the heating command signal 17*a*, and the air-sending command signal 19*c*.

The heating plan processor 7*a* includes a functional block that performs STEP-1 and a functional block that performs STEP-2.

The functional block (hereinafter also referred to as a block 1) that performs STEP-1 receives the heating constraint condition 17*b*, the temperature change rate constraint condition 17*c*, the temperature maximum value constraint condition 17*d*, and the temperature measurement signals 16, 16*a*, and 16*b* and outputs the heating plan proposal 17*g*. The block 1 performs simulation calculation by using the input signals. Formulae used in the simulation calculation will be described later in Section [C-4].

The functional block (hereinafter also referred to as a block 2) that performs STEP-2 receives the heating plan proposal 17*g*, the heating permission signal 17*f*, and the time signal 17*e* and outputs the execution heating plan 17*h*, the heating command signal 17*a*, and the air-sending command signal 19*c*. The block 2 determines and outputs the execution heating plan 17*h* based on the heating plan proposal 17*g* and the heating permission signal 17*f*. The block 2 additionally outputs the heating command signal 17*a* and the air-sending command signal 19*c* based on the heating permission signal 17*f* and the time signal 17*e*. Details of these processes will be described later in Section [C-2].

[C-2] Process of Heating Plan Production

Figure 18:
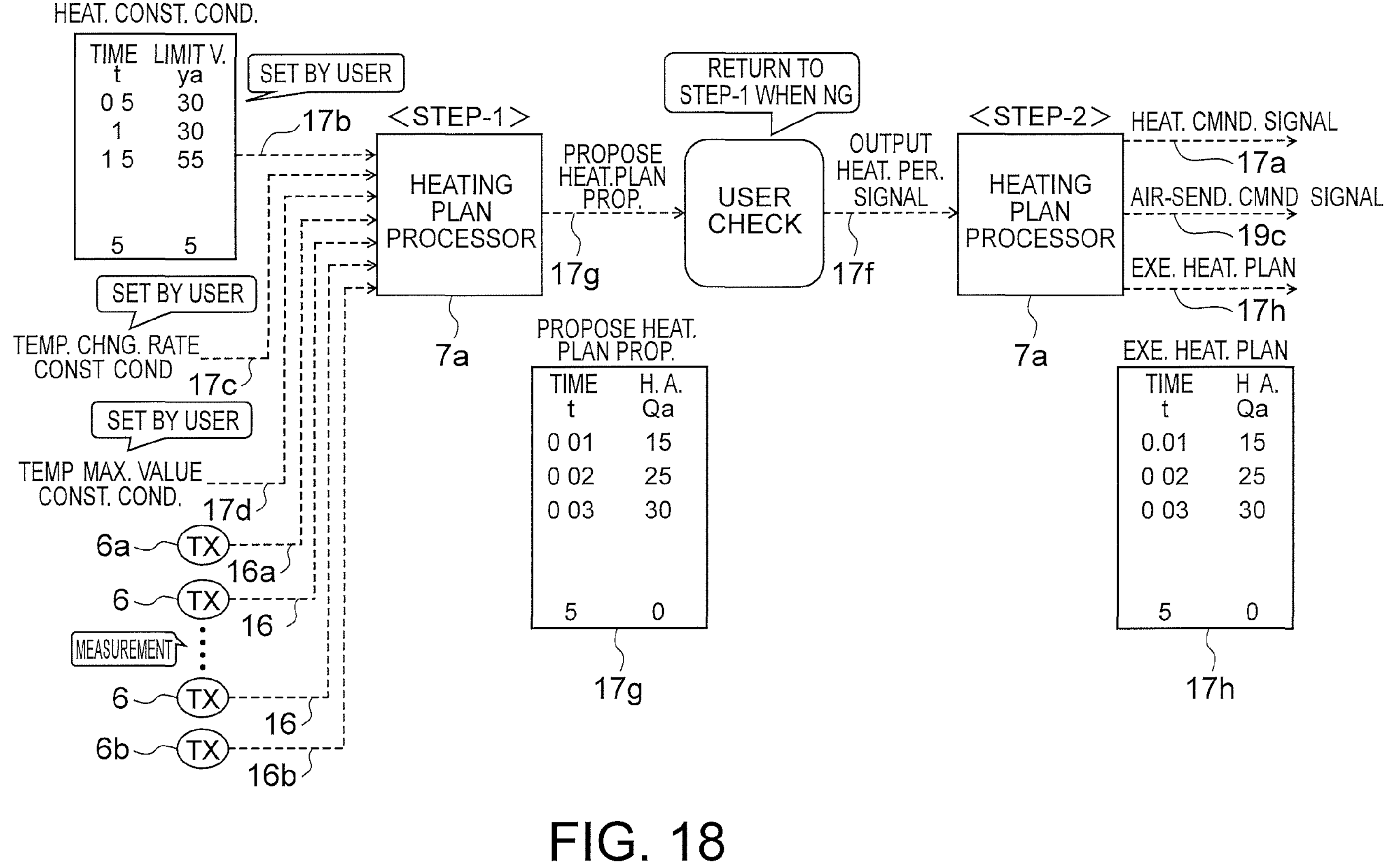
FIG. 18 is a diagram for description of operation of the heating plan processor of the third embodiment.

FIG. 18 is a diagram for description of operation of the heating plan processor 7*a* of the third embodiment, illustrating the process of heating plan production.

First, various kinds of conditions and the like are input to the heating plan processor 7*a*. Examples of the conditions and the like are the heating constraint condition 17*b*, the temperature change rate constraint condition 17*c*, the temperature maximum value constraint condition 17*d*, and the temperature measurement signals 16, 16*a*, and 16*b*.

Subsequently, the heating plan processor 7*a* performs calculation at STEP-1 based on the conditions and the like and outputs the heating plan proposal 17*g*. The heating plan processor 7*a* performs the simulation calculation described in [C-3] as the calculation at STEP-1.

The heating plan proposal 17*g* is a proposal for a heating plan, and the heating plan is a plan indicating in which manner heating of the heat transfer fluid 12*c* by the heater 1 is to be performed. Specifically, the heating plan proposal 17*g* of the present embodiment is data string as combination of a time at which the heating is to be performed and a numerical value indicating the degree of the heating. The data string is constituted by a string of numerical values in a short time interval (for example, one second, several seconds, one minute, or several minutes) until a heating end time tm. The data string is desirably displayed as a graph at user check to be described later but does not necessarily need to be displayed as a graph. The numerical value indicating the degree of the heating is, for example, the amount Qa of energy consumption by the heater 1. The heating plan proposal 17*g* may additionally include, for example, the internal temperature of the heat storage 2 at each time and the air-sending volumes of the first and second air senders 4*a* and 4*b* at each time as a simulation calculation result. In this case, the heating plan proposal 17*g* may include the internal temperature of the heat storage 2 at a plurality of places at each time.

Subsequently, the heating plan processor 7*a* displays the heating plan proposal 17*g* on a user interface at STEP-1, thereby proposing the heating plan proposal 17*g* to a user. When having checked the heating plan proposal 17*g* and determined that the proposal is a desired plan, the user performs, on the user interface, a predetermined operation indicating that the heating plan proposal 17*g* is a desired plan. Accordingly, the heating permission signal 17*f* is input to the heating plan processor 7*a*. When having checked the heating plan proposal 17*g* and determined that the proposal is not a desired plan, the user corrects at least one of the values of the heating constraint condition 17*b*, the temperature change rate constraint condition 17*c*, and the temperature maximum value constraint condition 17*d* on the user interface. In this case, the heating plan processor 7*a* returns to the calculation at STEP-1.

When the heating permission signal 17*f* is input to the heating plan processor 7*a*, the heating plan processor 7*a* proceeds to calculation at STEP-2.

At STEP-2, the heating plan processor 7*a* employs and outputs the heating plan proposal 17*g* as the execution heating plan 17*h*. The execution heating plan 17*h* is a heating plan used when operation of the heater 1 is actually controlled by the heating controller 7. Specifically, similarly to the heating plan proposal 17*g*, the execution heating plan 17*h* of the present embodiment is data string as combination of a time at which the heating is to be performed and a numerical value indicating the degree of the heating. The heating controller 7 of the present embodiment operates the heater 1 in accordance with the execution heating plan 17*h* developed by the heating plan processor 7*a*.

At STEP-2, the heating plan processor 7*a* also outputs the heating command signal 17*a* and the air-sending command signal 19*c* at a predetermined time in accordance with the execution heating plan 17*h*. Accordingly, the heating controller 7 controls operation of the heater 1 in accordance with the heating command signal 17*a*, and the air-sending controller 9 controls operation of the first and second air senders 4*a* and 4*b* in accordance with the air-sending command signal 19*c*. As a result, heating control and air-sending control in accordance with the execution heating plan 17*h* can be achieved. The heating controller 7 and the air-sending controller 9 may each receive the execution heating plan 17*h* from the heating plan processor 7*a* and control operation of the heater 1 and the first and second air senders 4*a* and 4*b* based on the received execution heating plan 17*h*, thereby executing heating control and air-sending control in accordance with the execution heating plan 17*h*.

[C-3] Specific Example of Heating Plan Proposal 17*g*

Figure 19:
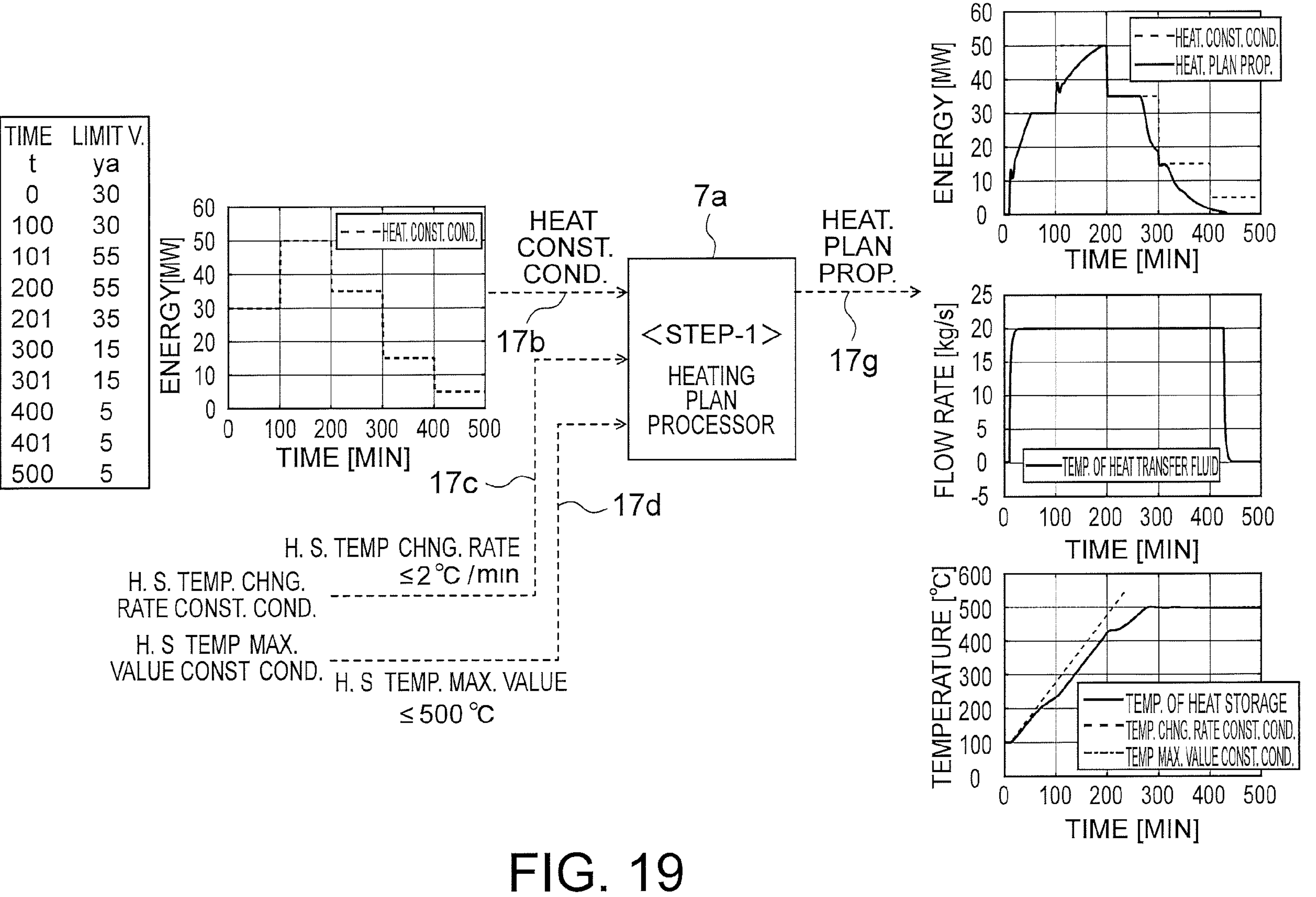
FIG. 19 is a diagram for description of details of operation of the heating plan processor of the third embodiment.

FIG. 19 is a diagram for description of details of operation of the heating plan processor 7*a* of the third embodiment, illustrating a specific production example of the heating plan proposal 17*g*.

First, the heating constraint condition 17*b* is set as illustrated on the left side in FIG. 19. In this example, [minute] is used as the unit of time t. In addition, [MW] is used as the heating constraint value (limit value) ya. Specifically, with the heating constraint condition 17*b* of this example, the amount of energy consumption for first 100 minutes is 30 [MW], and the amount of energy consumption for the following 101 to 200 minutes is 55 [MW]. In this example, the heating constraint condition 17*b* is values that change at steps for understanding of description, but does not necessarily need to be values that change at steps.

Subsequently, the temperature change rate constraint condition 17*c* is input. In this example, the change rate of the internal temperature of the heat storage 2 is set to be equal to or lower than 2 [° C./min] (≤2 [° C./min]).

Subsequently, the temperature maximum value constraint condition 17*d* is input. In this example, the maximum value of the internal temperature of the heat storage 2 is set to be equal to or lower than 500 [° C.] (≤500 [° C.]).

Subsequently, the heating plan processor 7*a* performs the calculation at STEP-1 and outputs the heating plan proposal 17*g*. The right side in FIG. 19 illustrates examples of graph display of the heating plan proposal 17*g*. The first graph on the right side in FIG. 19 illustrates a result of comparison between the energy consumption amount Qa and the heating constraint condition 17*b*. The second graph illustrates the flow rate of the heat transfer fluid 12*a*. The third graph illustrates change of the internal temperature indicated by a temperature measurement signal 16 and a result of comparison between the temperature change rate constraint condition 17*c* and the temperature maximum value constraint condition 17*d*.

Subsequently, the user checks the heating plan proposal 17*g* on the user interface. In this example, the user can check five points as follows. Firstly, the energy consumption amount Qa is constantly equal to or smaller than the heating constraint condition 17*b*. Secondly, the internal temperature of the heat storage 2 is constantly equal to or lower than the temperature maximum value constraint condition 17*d*. Thirdly, the change rate of the internal temperature of the heat storage 2 is constantly equal to or smaller than the temperature change rate constraint condition 17*c*. Fourthly, in a range in which the amount of energy consumption is larger than zero, the flow rate of the heat transfer fluid 12*a* is larger than zero, which indicates that appropriate air-sending is performed. Fifthly, heating and air-sending are started at the time of 10 minutes and ended at the time of 430 minutes, which indicates that the time period of operation in the heat storing mode is 420 minutes.

As described above in the five points, the user can check necessary information on the user interface and appropriately determine whether to employ the presented heating plan proposal 17*g*.

[C-4] Details of Simulation Calculation

Figure 20:
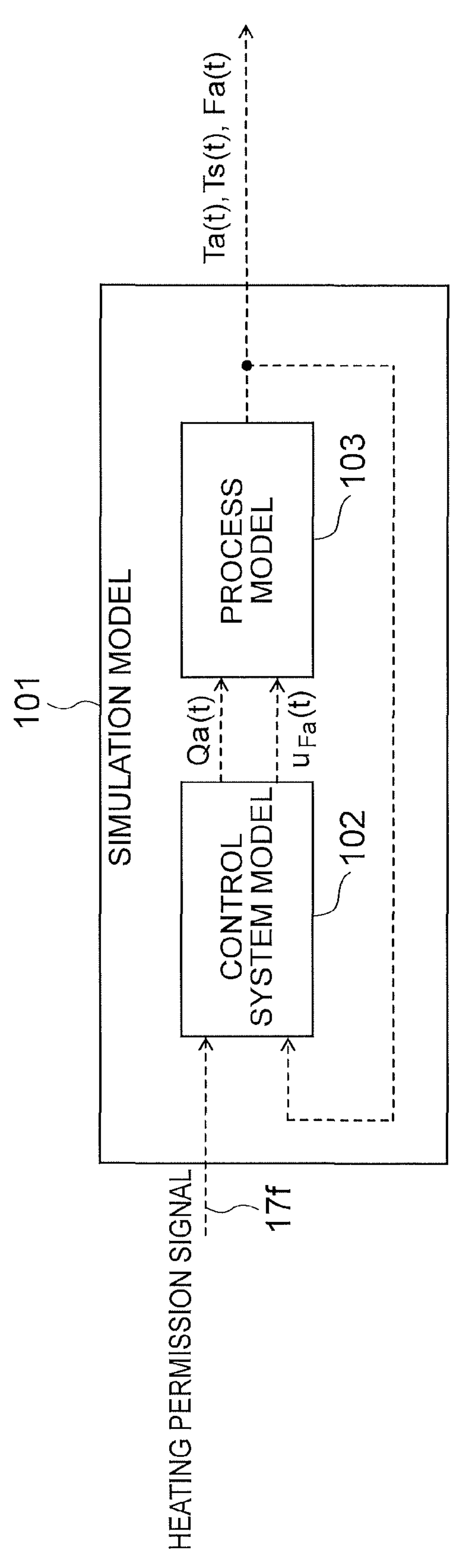
FIG. 20 is a schematic diagram illustrating a functional configuration of a simulation model of the third embodiment.

FIG. 20 is a schematic diagram illustrating a functional configuration of a simulation model 101 of the third embodiment.

The heating plan processor 7*a* of the present embodiment performs the above-described simulation calculation by using the simulation model 101 illustrated in FIG. 20. The simulation model 101 includes a control system model 102 and a process model 103. The simulation model 101 uses the temperature measurement signals 16, 16*a*, and 16*b* as an initial condition at start of the simulation calculation.

FIG. 21 is a diagram for description of the process model 103 of the third embodiment.

The process model 103 is written in differential equations in the forms of Expressions (1) to (4) below (refer to FIG. 21 as well). In the expressions, f1( ), f2( ), f3( ), f4( ) are physical equations that can be written with variables in ( ).

Expression (1) is a temperature change model formula of the heat storage 2.

$$\frac{d}{dt}Ts(x,t) = f1(Ts(x,t), Ta(x,t), Fa(t)) \quad (1)$$

Expression (2) is a temperature change model formula of the heat transfer fluid 12*d* in the heat storage 2.

$$\frac{d}{dt}Ta(x,t) = f2(Ts(x,t), Ta(x,t), Fa(t)) \quad (2)$$

Expression (3) is a temperature change model formula of the heat transfer fluid 12*a* output from the heater 1.

$$\frac{d}{dt}Ta(x0,t) = f3(Ta(xn,t), Fa(t), Qa(t)) \quad (3)$$

Expression (4) is a flow rate change model formula of the heat transfer fluid 12*a* output from the heater 1.

$$\frac{d}{dt}Fa(t) = f4(Fa(t), uFa(t)) \quad (4)$$

In the expressions, Fa(t) represents the flow rates of the heat transfer fluids 12*a*, 12*b*, and 12*c*, Ts(x, t) represents the internal temperature of the heat storage 2, Ta(x, t) represents the temperature of the heat transfer fluid 12*d* in the heat storage 2, Ta(x0, t) represents the temperature of the heat transfer fluid 12*a* at the exit of the heater 1 (the entrance of the heat storage 2), Ta(xn, t) represents the temperature of the heat transfer fluid 12*b* at the entrance of the heater 1 (the heat transfer fluid 12*c* at the exit of the heat storage 2), Qa(t) represents the heating control signal 17 in the heater 1 (actual output=control signal because of fast response), and uFa(t) represents the first air-sending control signal 19*a*.

The simulation model 101 of the present embodiment uses the temperature measurement signal 16 measured by the temperature meter 6 as an initial value for the process model 103. Any of the configuration in FIGS. 3 to 8 described above in the first embodiment and the configuration in FIGS. 11 to 13 and FIGS. 4 to 7 described above in the second embodiment is programmed and used as the simulation model 101 of the present embodiment.

The simulation model 101 of the present embodiment performs simulation calculation by combining the process model 103 and the control system model 102. The simulation calculation is performed for a sufficiently long time period including the heating end time tm.

According to the present embodiment, it is possible to obtain the heating plan proposal 17*g* before actually performing heating operation. Accordingly, it is possible to develop a plan for the amount of energy consumption by the heater 1. This is effective, for example, when the heater 1 is operated by using renewable energy. Moreover, according to the present embodiment, it is possible to achieve operation in accordance with the heating plan proposal 17*g* by employing the heating plan proposal 17*g* as the execution heating plan 17*h*.

As described above, the heat storage power generation system of the first embodiment controls heating of the heat transfer fluid 12*c* by the heater 1 based on the first limit value related to the amount of energy consumption by the heater 1, the second limit value related to the temperature of the heat transfer fluid 12*a*, the third limit value related to the maximum value of the internal temperature of the heat storage 2, and the fourth limit value related to the change rate of the internal temperature of the heat storage 2. According to the present embodiment, it is possible to perform heating control based on the limit values by developing the heating plan proposal 17*g* on which the limit values is reflected and by operating the heater 1 in accordance with the heating plan proposal 17*g*. Specifically, the heating plan processor 7*a* of the present embodiment develops the heating plan proposal 17*g* by using the heating constraint condition 17*b*, the temperature change rate constraint condition 17*c*, the temperature maximum value constraint condition 17*d*, and the like.

Fourth Embodiment

[A] Details of Heating Plan Processor 7*a*

FIG. 22 is a diagram for description of an evaluating function and constraint conditional expressions of a fourth embodiment.

Similarly to the heat storage power generation system of the third embodiment, the heat storage power generation system of the present embodiment has the configuration illustrated in FIG. 15. Moreover, the temperature meters 6, 6*a*, and 6*b* of the present embodiment are disposed as illustrated in FIG. 16. However, the heating plan processor 7*a* of the present embodiment develops the heating plan proposal 17*g* by using the evaluating function and constraint conditional expressions illustrated in FIG. 22.

[A-1] Process of Heating Plan Production

Similarly to the third embodiment, the heating plan processor 7*a* of the present embodiment has the same functional configuration as in FIG. 17. Moreover, similarly to the third embodiment, the process of heating plan production in the present embodiment is the same as in FIG. 18. However, the heating plan processor 7*a* of the present embodiment solves an optimization problem with constraint conditions instead of performing simple simulation calculation when developing the heating plan proposal 17*g* at STEP-1. According to the present embodiment, it is possible to obtain the heating plan proposal 17*g* in more detail at higher accuracy by developing the heating plan proposal 17*g* through optimization calculation. Formulation and solution of the optimization problem with constraint conditions will be described later in Section [A-2].

Similarly to the third embodiment, a specific example of the heating plan proposal 17*g* of the present embodiment is the same as in FIG. 19. However, according to the present embodiment, it is possible to obtain the heating plan proposal 17*g* in more detail at higher accuracy than in the third embodiment.

[A-2] Optimization Problem with Constraint Conditions

In the optimization problem of the present embodiment, an evaluating function (objective function) of Expression (5) is used.

$$J = \text{minimize } tm \tag{5}$$

In the optimization problem of the present embodiment, constraint conditional expressions of Expressions (6) to (8) are used. Expression (6) expresses limitation on the maximum value of the internal temperature at the position of measurement by the temperature measurement signal 16 in the heat storage 2. Expression (7) expresses limitation on the change rate of the internal temperature at the position of measurement by the temperature measurement signal 16 in the heat storage 2. Expression (8) expresses limitation on the maximum value of the temperature of the heat transfer fluid 12*a*.

$$\max(Ts(x, t)) \le Ts\max \tag{6}$$

$$\frac{d}{dt}Ts(x1, t) \le Tsd\max \tag{7}$$

$$\max(Ta(x0, t)) \le Ta\max \tag{8}$$

In the expressions, tm represents the heating end time. The heating end time tm can be calculated as a time at which the first air-sending control signal 19*a* in FIG. 15 becomes "False". In addition, Tsmax represents the value of the temperature maximum value constraint condition 17*d*, Tsdmax represents the value of the temperature change rate constraint condition 17*c*, and Tamax represents a maximum temperature limit value of the heat transfer fluid 12*a*.

The heating plan processor 7*a* of the present embodiment uses Expressions (1) to (4) as a process model of the optimization calculation. The heating plan processor 7*a* of the present embodiment also uses a program of the configuration in FIG. 9 as an air-sending control model.

Figure 23:
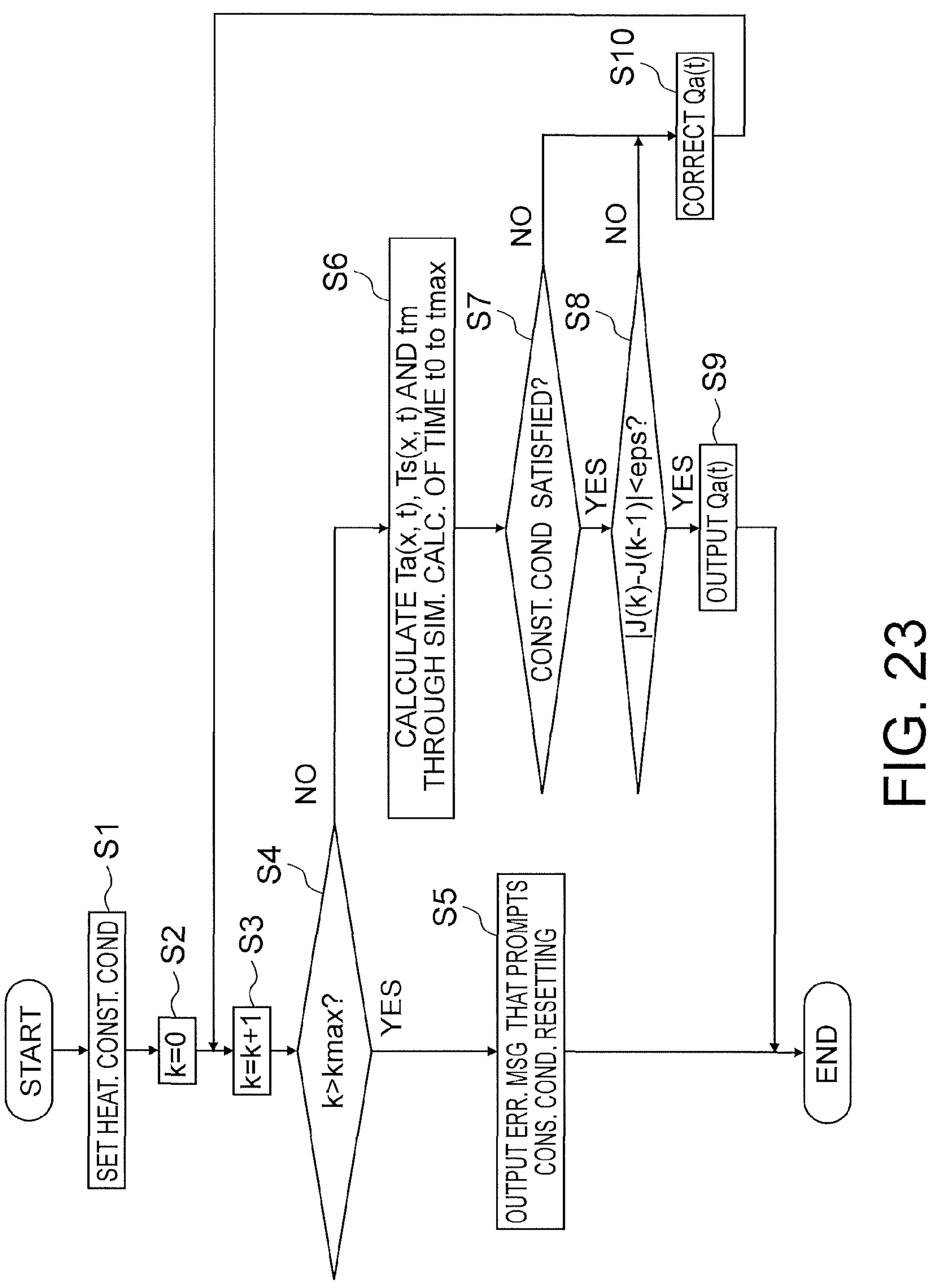
FIG. 23 is a flowchart illustrating operation of a heat storage power generation system of the fourth embodiment.

FIG. 23 is a flowchart illustrating operation of the heat storage power generation system of the fourth embodiment. Specifically, FIG. 23 illustrates an example of solution of the above-described optimization calculation. The heating plan processor 7*a* of the present embodiment may perform, for example, the optimization calculation illustrated in FIG. 23.

First, the heating constraint condition 17*b* is set as the initial value of Qa(t) (step S1). Subsequently, a calculation count k is set to zero (step S2). Subsequently, the calculation count k is incremented (step S3), and whether the calculation count k has reached an upper limit kmax is determined (step S4). When the determination at step S4 is "YES", an error message that prompts constraint condition resetting is output because Qa(t) that satisfies the constraint condition cannot be found (step S5).

When the determination at step S5 is "NO", the simulation calculation of time t0 to tmax is performed by using the above-described process model and air-sending control model to calculate Ta(x, t), Ts(z, t), and tm (step S6). Subsequently, whether the constraint conditions of Expressions (6) to (8) are satisfied is determined (step S7).

When the determination at step S7 is "YES", whether $|J(k)-J(k-1)|<eps$ is satisfied is determined (step S8). In the expression, J(k) represents the evaluating function J calculated for the k-th time. When the determination at step S8 is "YES", Qa(t) is output as a desired plan (step S9). When the determination at step S7 or S8 is "NO", Qa(t) is corrected (step S10) and the process returns to step S3. In this manner, Qa(t) as the heating plan proposal 17*g* that satisfies the constraint conditions can be calculated.

According to the present embodiment, it is possible to obtain the heating plan proposal 17*g* before actually performing heating operation. Accordingly, it is possible to develop a plan for the amount of energy consumption by the heater 1. This is effective, for example, when the heater 1 is operated by using renewable energy. Moreover, according to the present embodiment, it is possible to achieve operation in accordance with the heating plan proposal 17*g* by employing the heating plan proposal 17*g* as the execution heating plan 17*h*.

As described above, the heat storage power generation system of the first embodiment controls heating of the heat transfer fluid 12*c* by the heater 1 based on the first limit value related to the amount of energy consumption by the heater 1, the second limit value related to the temperature of the heat transfer fluid 12*a*, the third limit value related to the maximum value of the internal temperature of the heat storage 2, and the fourth limit value related to the change rate of the internal temperature of the heat storage 2. According to the present embodiment, it is possible to perform heating control based on the limit values by developing the heating plan proposal 17*g* on which the limit values are reflected and by operating the heater 1 in accordance with the heating plan proposal 17*g*. This is the same as in the third embodiment.

Fifth Embodiment

[A] Details of Heating Plan Processor 7*a*

Figure 24:
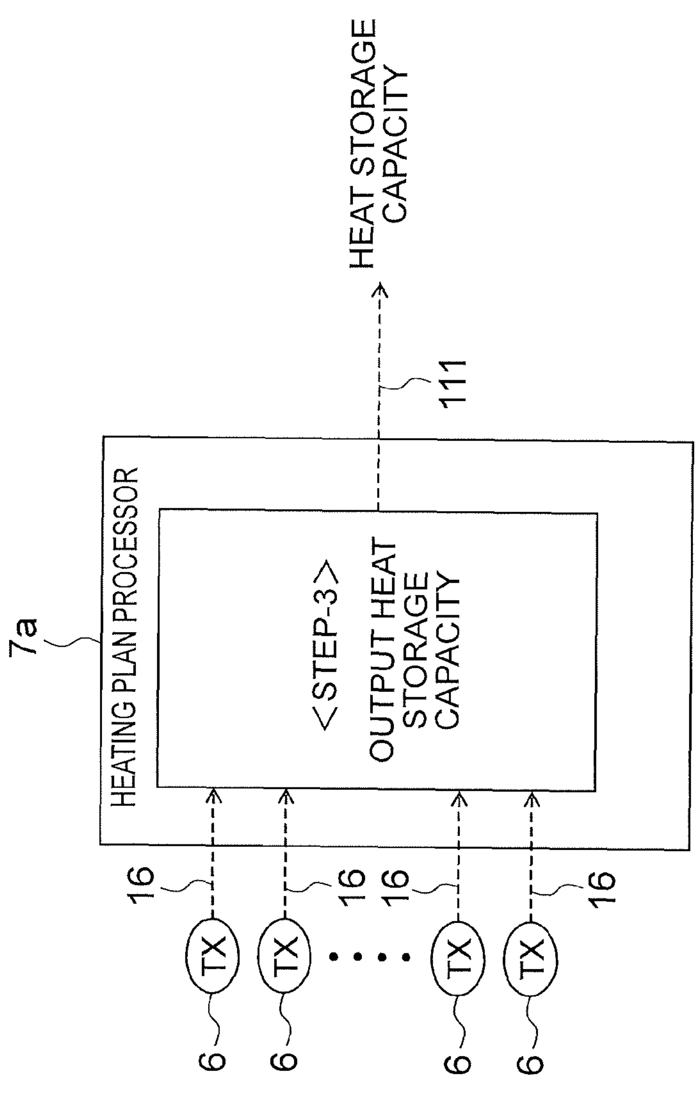
FIG. 24 is a schematic diagram illustrating a functional configuration of a heating plan processor of a fifth embodiment.

FIG. 24 is a schematic diagram illustrating a functional configuration of the heating plan processor 7*a* of a fifth embodiment.

Similarly to the heat storage power generation system of the third embodiment, the heat storage power generation system of the present embodiment has the configuration illustrated in FIG. 15. Moreover, the temperature meters 6, 6*a*, and 6*b* of the present embodiment are disposed as illustrated in FIG. 16. However, the heating plan processor 7*a* of the present embodiment has a function configuration illustrated in FIG. 24.

The heating plan processor 7*a* of the present embodiment is used for a purpose different from that of the heating plan processor 7*a* of the third and fourth embodiments, and accordingly, has functions different from those of the heating plan processor 7*a* of the third and fourth embodiments.

The heating plans developed in the third and fourth embodiments are heating plans for a relatively short duration necessary for a time period of several hours to several weeks, for example. However, a plan for a long duration of months or years is necessary in some cases such as development of a power source plan. In a case in which such a plan for a long duration is developed, the heating plans of the third and fourth embodiments with added individual constraint conditions are unnecessarily detailed, and as a result, require a significant amount of calculation and are cumbersome to handle in some cases.

To avoid such cases, the heating plan processor 7*a* that is suitable for development of a heating plan for a relatively long duration will be described below in the present embodiment. The heating plan processor 7*a* of the present embodiment outputs heating capacity (heat storage capacity) 111 that is minimum information needed to develop a heating plan for a long duration as illustrated in FIG. 24.

[A-1] Input-Output Signals and Functional Configuration of Heating Plan Processor 7*a*

The heating plan processor 7*a* of the present embodiment receives the plurality of temperature measurement signals 16 from the plurality of temperature meters 6 and outputs the heating capacity 111. The heating plan processor 7*a* of the present embodiment includes a functional block that performs STEP-3. The contents of calculation at STEP-3 will be described later in Sections [A-2], [A-3], and [A-4].

[A-2] Internal Temperature Ts(Xa, Tk)

FIGS. 25A to 25C are schematic diagrams for description of the internal temperature Ts(xa, tk) of the heat storage 2 of the fifth embodiment.

FIG. 25A illustrates distribution of the internal temperature of the heat storage 2 in a case in which operation of the heat storage 2 has been started in the heat storing mode and time has elapsed by t1. The graph illustrated in the heat storage 2 illustrates the relation between a place x in the lateral direction in the heat storage 2 and the internal temperature T of the heat storage 2. In FIG. 25A, the internal temperature T at time t=t1 and place x=xa is expressed as Ts(xa, t1). In addition, a curve of the internal temperature Ts(xa, t1) is expressed as C1 in FIG. 25A.

Similarly, FIG. 25B illustrates distribution of the internal temperature of the heat storage 2 at time tk in the heat storing mode, and FIG. 25C illustrates distribution of the internal temperature of the heat storage 2 at time tm in the heat storing mode. In this manner, FIGS. 25A to 25C illustrate temporal change of the internal temperature of the heat storage 2 in the heat storing mode. Additional characters 1, k, and m in time t1, tk, and tm are integers that satisfy the relation of 1≤k≤m. In FIGS. 25B and 25C, the internal temperature T at time t=tk and place x=xa is expressed as Ts(xa, tk), and the internal temperature T at time t=tm and place x=xa is expressed as Ts(xa, tm). In addition, a curve of the internal temperature Ts(xa, tk) is expressed as Ck and a curve of the internal temperature Ts(xa, tm) is expressed as Cm in FIGS. 25B and 25C.

Hereinafter, distribution of the internal temperature Ts(xa, t1) is also referred to as internal temperature distribution Ts(xa, t1). Similarly, distribution of the internal temperature Ts(xa, tk) is also referred to as internal temperature distribution Ts(xa, tk), and distribution of the internal temperature Ts(xa, tm) is also referred to as internal temperature distribution Ts(xa, tm).

The heating plan processor 7*a* of the present embodiment receives, for example, the internal temperatures at M places in the heat storage 2 at time tk from M temperature meters 6 (M is an integer of two or larger). The heating plan processor 7*a* of the present embodiment can determine the internal temperature distribution Ts(xa, tk) at time t=tk by applying interpolation processing to the internal temperatures. In other words, the heating plan processor 7*a* of the present embodiment can determine a function (Ts(xa, tk)) representing distribution of the internal temperature of the heat storage 2 as a function of place xa and time tk. This allows accurate understanding of the internal temperature of the heat storage 2. Examples of the interpolation processing are linear interpolation and spline interpolation. The heating plan processor 7*a* of the present embodiment may determine the internal temperature distribution Ts(xa, tk) at time t=tk irrespective of the interpolation processing.

The internal temperature of the heat storage 2 rises as the heat storage 2 is operated in the heat storing mode. Along with the rise of the internal temperature of the heat storage 2, the temperature of the heat transfer fluid 12*b* output from the heat storage 2 rises as well. When the temperature of the heat transfer fluid 12*b* output from the heat storage 2 is equal to or higher than a certain value, heat exchange cannot be performed between the heat transfer fluid 12*d* and the heat storage 2, and accordingly, the heat storing mode ends. Time tm of the present embodiment is a time at which the temperature of the heat transfer fluid 12*b* reaches a sufficiently high temperature. The internal temperature distribution Ts(x, tm) at time tm can be determined by analysis or test operation in advance. The heating plan processor 7*a* of the present embodiment stores the internal temperature distribution Ts(x, tn) at time tm in advance.

[A-3] Heat Storable Energy Amount Es(Tk)

Figures 26A, 26B, 26C:
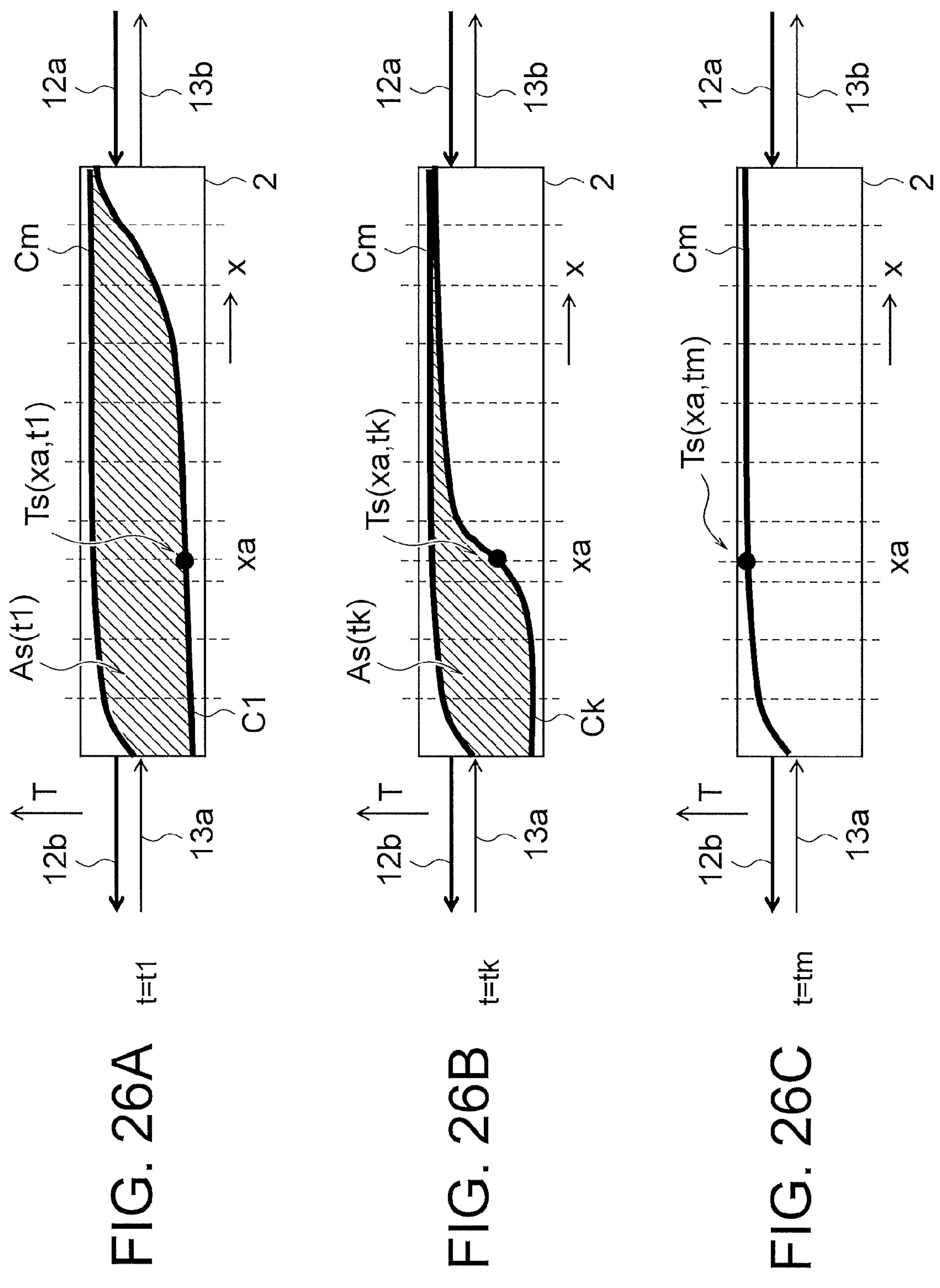
FIGS. 26A to 26C are schematic diagrams for description of a heat storable energy amount Es(tk) of the heat storage of the fifth embodiment.

FIGS. 26A to 26C are schematic diagrams for description of a heat storable energy amount Es(tk) of the heat storage 2 of the fifth embodiment.

FIG. 26A illustrates the curve C1 of the internal temperature distribution Ts(x, t1) time t1 together with the curve Cm of the internal temperature distribution Ts(x, tm) at time tm. FIG. 26A also illustrates integration value As(t1) of the internal temperature difference of Ts(x, tm)−Ts(x, t1) at time t1. The integration value As(t1) corresponds to the area between the curves C1 and Cm from place x0 at the entrance of the heat storage 2 to place xe at the exit of the heat storage 2. The integration value As(t1) is given by Expression (9) below.

$$As(t1) = \int_{x0}^{xe} \{Ts(x, tm) - Ts(x, t1)\}dx \tag{9}$$

FIG. 26B illustrates the curve Ck of the internal temperature distribution Ts(x, tk) at time tk together with the curve Cm of the internal temperature distribution Ts(x, tm) at time tm. FIG. 26B also illustrates integration value As(tk) of the internal temperature difference of Ts(x, tm)−Ts(x, tk) at time tk. The integration value As(tk) corresponds to the area between the curves Ck and Cm from place x0 at the entrance of the heat storage 2 to place xe at the exit of the heat storage 2. The integration value As(tk) is given by Expression (10) below.

$$As(tk) = \int_{x0}^{xe} \{Ts(x, tm) - Ts(x, tk)\}dx \tag{10}$$

FIG. 26C illustrates the curve Cm of the internal temperature distribution Ts(x, tm) at time tm. Integration value As(tm) of the internal temperature difference of Ts(x, tm)−Ts(x, tm) at time tm is zero (As(tm)=0).

In addition, the heating plan processor 7*a* of the present embodiment calculates the heat storable energy amount Es(tk), in other words, the thermal energy amount Es(tk) of heat that the heat storage 2 can store from time tk to time tm in the heat storing mode. Time tk is an example of a first time, and time tm is an example of a second time. The heat storable energy amount Es(tk) of the present embodiment is calculated by using the internal temperature distribution Ts(xa, tk) as described later.

Assume that the integration value As(t1) is calculated by Expression (9) at time t1. When the heat capacity and mass of the heat storage material in the heat storage 2 are Cpm

[kJ/Kg/° C.] and W [kg], the heat storable energy amount Es(t1) at time t1 is given by Expression (11) below.

$$Es(t1) = As(t1) * Cpm * W \tag{11}$$

Similarly, assume that the integration value As(tk) is calculated by Expression (12) at time tk. In this case, the heat storable energy amount Es(tk) at time tk is given by Expression (12) below.

$$Es(tk) = As(tk) * Cpm * W \tag{12}$$

The heat storable energy amount Es(tm) at time tm is zero (Es(tm)=0).

For example, at optional time tk that satisfies t1≤tk≤tm, the heating plan processor 7*a* of the present embodiment can calculate the integration value As(tk) from the internal temperature distribution Ts(x, tm) by using Expression (10) and calculate the heat storable energy amount Es(tk) from the integration value As(tk) by using Expression (12). The heating plan processor 7*a* of the present embodiment can develop heating plans (the heating plan proposal 17*g* and the execution heating plan 17*h*) at time tk or later by using a heat storable energy amount Eg(tk).

According to the present embodiment, it is possible to obtain the heating plan proposal 17*g* before actually performing heating operation. Accordingly, it is possible to develop a plan for the amount of energy consumption by the heater 1. This is effective, for example, when the heater 1 is operated by using renewable energy. Moreover, according to the present embodiment, it is possible to achieve operation in accordance with the heating plan proposal 17*g* by employing the heating plan proposal 17*g* as the execution heating plan 17*h*.

As described above, the heat storage power generation system of the first embodiment controls heating of the heat transfer fluid 12*c* by the heater 1 based on the first limit value related to the amount of energy consumption by the heater 1, the second limit value related to the temperature of the heat transfer fluid 12*a*, the third limit value related to the maximum value of the internal temperature of the heat storage 2, and the fourth limit value related to the change rate of the internal temperature of the heat storage 2. According to the present embodiment, it is possible to perform heating control based on the limit values by developing the heating plan proposal 17*g* on which the limit values are reflected and by operating the heater 1 in accordance with the heating plan proposal 17*g*. This is the same as in the third and fourth embodiments.

Other Embodiments

[A] Feedback Control Method

In the first to fifth embodiments, PI control is used for the fluid temperature controller 22, the temperature change rate controller 23, and the temperature maximum value controller 24 for the purpose of description. However, this may be replaced with any other feedback control method. Specifically, examples of the other feedback control methods include PI control variations such as P control, I control, and PID control, model-based control methods such as optimum regulator, model prediction control, and H∞ control, and methods of using fuzzy logic, but the present invention is not limited to these examples.

[B] Method of Implementing Feedback Control Method

In the first to fifth embodiments, the fluid temperature controller 22, the temperature change rate controller 23, and the temperature maximum value controller 24 have position-type configurations for the purpose of description, but may have speed-type configurations with which equivalent control functions can be implemented.

[C] Method of Achieving Signal Selectors 25, 26, and 27

In the first to fifth embodiments, low-value selectors are used as the signal selectors 25, 26, and 27, but the same functions thereof can be achieved with switching switches.

[D] Method of Utilizing Execution Heating Plan 17*h*

In the third and fourth embodiments, when the execution heating plan 17*h* is obtained, the execution heating plan 17*h* may be used in place of the heating constraint condition 17*b* set to the heating limitation setter 21. With this configuration as well, equivalent effects can be obtained.

[E] Relation Between Third and Fourth Embodiments and Fifth Embodiment

The heating plan processor 7*a* described in the third embodiment may have a function of the heating plan processor 7*a* described in the fifth embodiment, in other words, STEP-3. Similarly, the heating plan processor 7*a* described in the fourth embodiment may have a function of the heating plan processor 7*a* described in the fifth embodiment, in other words, STEP-3.

While certain embodiments have been described, these embodiments have been presented by way of example only, and are not intended to limit the scope of the inventions. Indeed, the novel systems described herein may be embodied in a variety of other forms; furthermore, various omissions, substitutions and changes in the form of the systems described herein may be made without departing from the spirit of the inventions. The accompanying claims and their equivalents are intended to cover such forms or modifications as would fall within the scope and spirit of the inventions.

The invention claimed is:

1. A heat storage power generation system comprising:

a heater configured to heat first heat transfer fluid;

a heat storage including a heat storage material heated by the first heat transfer fluid, and configured to heat second heat transfer fluid with heat stored in the heat storage material;

a power generator configured to generate electric power by using the second heat transfer fluid;

a heating controller configured to control heating of the first heat transfer fluid by the heater; and a power generation controller configured to control power generation performed by the power generator, wherein the heating controller controls the heating of the first heat transfer fluid, based on a fourth limit value among a first limit value related to an amount of energy consumption by the heater, a second limit value related to temperature of the first heat transfer fluid, a third limit value related to internal temperature of the heat storage, and the fourth limit value related to a change rate of the internal temperature.

2. The system of claim 1, wherein the heating controller acquires the first limit value that changes in accordance with time.

3. The system of claim 1, wherein the heating controller controls the heating of the first heat transfer fluid so that two or more of the amount of energy consumption by the heater, the temperature of the first heat transfer fluid, the internal temperature, and the change rate of the internal temperature obey limitation with two or more limit values among the first limit value, the second limit value, the third limit value and the fourth limit value.

4. The system of claim 1, wherein the heating controller controls the heating of the first heat transfer fluid, based on a tightest limit value among two or more limit values among the first limit value, the second limit value, the third limit value and the fourth limit value.

5. The system of claim 4, wherein the heating controller selects the tightest limit value from among three or more limit values among the first limit value, the second limit value, the third limit value, and the fourth limit value with an override configuration.

6. The system of claim 4, wherein the heating controller selects the tightest limit value from among three or more limit values among the first limit value, the second limit value, the third limit value, and the fourth limit value with a cascade configuration.

7. The system of claim 1, further comprising one or more temperature meters configured to measure the internal temperature, or the temperature of the first heat transfer fluid, wherein the heating controller controls the heating of the first heat transfer fluid, based on the internal temperature, or the temperature of the first heat transfer fluid measured by the temperature meter.

8. The system of claim 1, further comprising:

a first air sender configured to circulate the first heat transfer fluid between the heater and the heat storage;

a second air sender configured to circulate the second heat transfer fluid between the heat storage and the power generator; and an air-sending controller configured to control operation of the first and second air senders.

9. The system of claim 1, further comprising a heating plan processor configured to develop a heating plan for the heater, wherein the heating controller controls the heating of the first heat transfer fluid, based on the heating plan.

10. The system of claim 9, wherein the heating plan processor develops the heating plan, based on the two or more limit values, and the heating controller controls the heating of the first heat transfer fluid based on two or more limit values among the first limit value, the second limit value, the third limit value and the fourth limit value, by controlling the heating of the first heat transfer fluid based on the heating plan.

11. The system of claim 9, wherein the heating plan processor develops the heating plan through simulation of operation of the heater.

12. The system of claim 9, wherein the heating plan processor develops the heating plan through optimization calculation related to operation of the heater.

13. The system of claim 9, further comprising one or more temperature meters configured to measure the internal temperature, or the temperature of the first heat transfer fluid, wherein the heating plan processor determines distribution of the internal temperature as a function of place and time based on the internal temperature measured by the temperature meters, and develops the heating plan based on the distribution of the internal temperature.

14. The system of claim 13, wherein the heating plan processor calculates an energy amount of heat that can be stored by the heat storage between a first time and a second time in a heat storing mode based on the distribution of the internal temperature, and develops the heating plan based on the energy amount.

15. A power generation control system configured to control a heat storage power generation system including:

a heater configured to heat first heat transfer fluid;

a heat storage including a heat storage material heated by the first heat transfer fluid, and configured to heat second heat transfer fluid with heat stored in the heat storage material; and a power generator configured to generate electric power by using the second heat transfer fluid, the power generation control system comprising:

a heating controller configured to control heating of the first heat transfer fluid by the heater; and a power generation controller configured to control power generation performed by the power generator, wherein the heating controller controls the heating of the first heat transfer fluid based on a fourth limit value among a first limit value related to an amount of energy consumption by the heater, a second limit value related to temperature of the first heat transfer fluid, a third limit value related to internal temperature of the heat storage, and the fourth limit value related to a change rate of the internal temperature.

* * * * *